United States Patent
Ohlson et al.

(10) Patent No.: US 6,222,828 B1
(45) Date of Patent: *Apr. 24, 2001

(54) ORTHOGONAL CODE DIVISION MULTIPLE ACCESS WAVEFORM FORMAT FOR USE IN SATELLITE BASED CELLULAR TELECOMMUNICATIONS

(75) Inventors: John E. Ohlson, Mountain View, CA (US); Donald R. Martin, Redondo Beach, CA (US)

(73) Assignees: TRW, Inc., Redondo Beach; Stanford Telecommunications, Inc., Sunnyvale, both of CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,244

(22) Filed: Oct. 30, 1996

(51) Int. Cl.[7] ........................ H04J 1/02
(52) U.S. Cl. ............ 370/320; 370/335; 370/342; 370/441; 455/13.4
(58) Field of Search ........................ 370/315, 316, 370/320, 335, 342, 441; 375/200, 206, 211; 455/13.4; 714/708

(56) References Cited

U.S. PATENT DOCUMENTS

| | | | |
|---|---|---|---|
| 5,077,793 | * 12/1991 | Falk et al. | 380/28 |
| 5,103,459 | 4/1992 | Gilhousen et al. | 375/1 |
| 5,619,525 | * 4/1997 | Wiedeman et al. | 370/316 |
| 5,654,955 | * 8/1997 | Natali | 370/320 |
| 5,696,672 | * 12/1997 | Natali et al. | 370/342 |
| 5,757,767 | * 5/1998 | Zehavi | 370/320 |
| 5,764,630 | * 6/1998 | Natali et al. | 370/335 |
| 5,910,945 | * 6/1999 | Garrison et al. | 370/324 |

OTHER PUBLICATIONS

Chapter 13, "An Introduction to GSM", by Redl et al., Published by Artech House Publishers, Boston, Mass., 1995.

* cited by examiner

Primary Examiner—Wellington Chin
Assistant Examiner—Frank Duong
(74) Attorney, Agent, or Firm—Michael S. Yatsko

(57) ABSTRACT

A communications waveform format is provided for a satellite-based telecommunications system. The waveform format includes forward and return link waveforms between the satellite, earth stations and terminals. The forward and return links use orthogonal direct-sequence code division multiple access (ODS-CDMA) to minimize interference between users. The forward and return link spectrum may be divided into channels, the frequencies and spacing of which are adjustable to compensate for Doppler effects, thereby maintaining synchronization. The spectrum of the terminal links may be divided into multiple subbands (e.g., 38), each of which may support multiple (e.g., 80) ODS-CDMA channels. The forward and return links support traffic channels (TCH), associated signaling channels (ASC), broadcast control channels (BCC), forward signaling channels (FSC) having paging slots (PAS) and channel allocation slots (CAS), call establishment channels (CEC), and loop signaling channels (LSC), a measurement reporting channel (MRC), and a return access channel (RAC). The RAC carries nonsynchronous spread spectrum pseudo-noise (PN) signal access bursts which are used by terminals to initially access the communications system.

3 Claims, 13 Drawing Sheets

ORTHOGONAL CODE DIVISION MULTIPLE ACCESS WAVEFORM FORMAT FOR USE IN SATELLITE BASED CELLULAR TELECOMMUNICATIONS

CROSS-REFERENCE TO RELATED APPLICATIONS

Not Applicable

STATEMENT REGARDING FEDERALLY SPONSORED RESEARCH OR DEVELOPMENT

Not applicable

BACKGROUND OF THE INVENTION

Technological advancements of the last several years have enabled satellite based systems to offer voice and data services to mobile terminals on a global basis. These systems can also provide voice and data services to fixed installation terminals, thereby enabling basic telephony services in areas lacking a terrestrial telecommunications infrastructure. Primary objectives of these personal communication satellite services (PCSS) are to offer the services at low prices and to provide a high level of service quality.

In recent years satellite based systems have been proposed which offer direct communication between mobile or fixed terminals and satellites arranged at low and medium altitudes. The communications links include traffic channels over which voice information or data are transmitted. Proposed satellite based telecommunications systems utilize earth stations to interconnect through gateways with conventional terrestrial phone networks. The earth stations may also route communications between satellites and terminals. The earth stations may further provide control over signaling, transmission timing and transmission frequency of the terminals as necessary to establish and maintain calls directed to or initiated by terminals.

Examples of recently proposed satellite based systems include the Globalstar™ system proposed by Globalstar™ Telecommunications Limited, the Iridium system proposed by Motorola Inc., and the Odyssey system proposed by TRW and Teleglobe.

The earth stations, satellites and mobile terminals communicate via a predefined waveform format. The waveform format supports forward communications links from earth stations through satellites to terminals. The waveform format also supports return communications links from the terminal through the satellite to the earth station. The design of the communications waveform format for a system plays a significant role in meeting the system's objectives such as enhancing bandwidth efficiency, enhancing satellite power usage efficiency, providing rapid terminal acquisition, providing robust communications links and maintaining user privacy. Further objectives include maximizing the number of simultaneous terminals that a system may support while minimizing the capital cost of the system. The number of terminals supported by a single satellite depends in part on the available bandwidth for communications between the satellite and terminals and between the satellite and earth stations. The number of terminals also depends upon the power required by each terminal, the satellites' RF transmission capability, physical environment factors (e.g., necessary link margins), regulatory constraints (e.g., terminal radiated power constraints, satellite power flux density constraints, out-of-band emissions constraints, etc.) and the like.

Communications waveform formats have been proposed in the past, such as the Telecommunication Industry Association/Electronics Industries Association Interim Standard 95 (IS-95) proposed by QUALCOMM, Inc., of San Diego, Calif., with some cooperative effort from AT&T, Motorola and others. IS-95 incorporates CDMA modulation techniques disclosed in U.S. Pat. No. 5,103,459. IS-95 describes a code division multiple access (CDMA) waveform format, in which multiple terminals communicate in a common bandwidth or subband. In this common subband, terminals are distinguished from one another by a code uniquely assigned to each terminal. The CDMA code may also be referred to as a codeword or "chip code". The chip code represents a pseudo-noise (PN) spreading code which "spreads" the signal over the available bandwidth and allows more terminals to communicate over the same frequency range. The chip code is combined or modulated with information bits which define a voice or data signal. The combined data stream of voice or data and the chip code is divided into frames and transmitted over a traffic channel. The chip code is transmitted at a rate (the chip rate) much faster than the information bit rate.

In the IS-95 waveform format, a single CDMA subband is 1.23 MHz wide and will support a theoretical maximum of 63 terminals or subscribers with unique CDMA codes. In practice, the transmissions to and from the terminals interfere with one another and unduly degrade the quality of each communications link if more than approximately 30 terminals share a subband for satellite application. In terrestrial application as few as 12 terminals may be able to share a subband. This type of interference is referred to as "multiple access interference". The IS-95 waveform format and CDMA generally are explained in more detail in chapter 13 of a book entitled "An Introduction to GSM", by Siegmund H. Reidl, Matthias K. Weber and Malcolm W. Oliphant, published by Artech House, Inc., of Norwood, Mass., 1995. Chapter 13 of the above-referenced book is expressly incorporated herein by reference.

However, CDMA systems thus far proposed have met with limited success. By way of example, the IS-95 waveform affords an asynchronous return link (i.e., from the terminal to the earth station) which unduly limits the number of terminals that may simultaneously communicate over a limited bandwidth.

In "asynchronous" CDMA terminals transmit communications to an earth station independent in time from one another. This results in far larger multiple access interference than may result with orthogonal CDMA.

Further, the IS-95 waveform uses a combination of "open loop" and "closed loop" methods for controlling signal power transmitted by the terminal in the return link. The terminal may adjust return link transmission power in part based on the power received on the forward link (i.e., open loop control). However, this open loop power control routine is inaccurate since power fluctuations of the signals on the forward and return links are not necessarily correlated to one another.

Moreover, the IS-95 waveform makes inefficient use of the available bandwidth by requiring every frame in the traffic channel to include "tail bits" to convert the convolutional code into a block code. These tail bits reduce the transmission rate for voice or data.

A need remains within the industry for an improved communications waveform for use in satellite based cellular telecommunications.

BRIEF SUMMARY OF THE INVENTION

It is an object of the present invention to provide a communications waveform format with enhanced bandwidth efficiency.

It is a corollary object of the present invention to provide a communications waveform format which utilizes orthogonal CDMA codes in the forward and return links to minimize multiple access interference between terminals, thereby increasing the number of terminals which may be supported per unit of allocated bandwidth.

It is another corollary object of the present invention to provide an orthogonal CDMA communications waveform format which uses a set of quadratic residue orthogonal CDMA codes, each of which allow a highly precise match between the information rate and the desired chip rate.

It is a further object of the present invention to provide a communications waveform format that provides continuous updates to return link transmitted power, frequency and timing, thereby enabling an orthogonal synchronous return link.

It is a further object of the present invention to provide a communications waveform format having a return link sync field which permits terminals to be independently tracked in a dense CDMA environment.

It is a further object of the present invention to provide constant envelope return link modulation, which provides low levels of unwanted power emissions from terminals while using inexpensive saturating amplifiers.

It is yet another object of the present invention to provide a communications waveform format having signaling transition frames used to signal a change of traffic channels between active and inactive states to avoid the need to transmit the number of tail bits with each frame.

It is yet a further object of the present invention to provide a communications waveform format in which the transmission power of the return link is varied during the transmission of frames to reduce self interference on the return link.

Another object of the present invention is to provide a communications waveform format with a reduced return link chip rate, while maintaining the same information rate on the forward and return links, thereby allowing a balanced use of forward and return links even though the return link operates with a smaller bandwidth allocation.

Another object of the present invention is to provide a communications waveform format which uses punctured convolutional codes to match information rates to the symbol rate, thereby enhancing satellite power usage efficiency.

It is yet a further object of the present invention to provide a communications waveform format which utilizes variable transmitted power on the forward link which may vary from symbol to symbol to further enhance satellite power usage efficiency.

It is even a further object of the present invention to provide a communications waveform format in which the traffic channel is turned inactive and the information bit rate is reduced to zero during periods in which no data or voice is transmitted.

It is a further object of the present invention to provide a communications waveform format which utilizes interleaving to mitigate the impact of an imperfect carrier phase reference.

It is a further object of the present invention to provide a communications waveform format having an isolation code which is the same for each frame, simplifying acquisition for terminals.

It is a further object of the present invention to provide a communications waveform format having an asynchronous return access channel to respond to pages and to initiate calls which provides small interference to orthogonal CDMA usage without requiring inefficient use of the available spectrum.

A communications waveform format is provided for a satellite-based telecommunications system. The waveform format includes forward and return link waveforms for the feeder links between the satellite and earth stations. The waveform format further includes forward and return link waveforms for the terminal links between the satellite and terminals (mobile or fixed). The satellites operate as "bent pipes" and perform frequency translation and signal filtering between feeder and terminal links, without effecting significant changes to the detailed waveform structure.

The forward and return links use orthogonal direct-sequence code division multiple access (ODS-CDMA) to minimize interference between users. The forward feeder link baseband spectrum may be divided into feeder channels, the transmitted frequencies and spacing of which are adjustable to compensate for Doppler effects, thereby maintaining synchronization between earth stations sharing a satellite. Each feeder channel is translated in frequency by the satellite and routed to a specific beam to be output as a forward terminal link. The spectrum of the forward terminal link may be divided into multiple subbands (e.g., 38), each of which may support multiple (e.g., 80) ODS-CDMA circuits or channels for individual mobile or fixed terminals. At least one feeder channel may be designated to carry only pilot tones as reference signals for the satellite. Pilot tones are used by satellites to determine proper power levels of incoming signals and enable users to be combined on common feeder links with the correct relative power.

The forward feeder link and forward terminal link support traffic channels (TCH), associated signaling channels (ASC), broadcast control channels (BCC), forward signaling channels (FSC) having paging slots (PAS) and channel allocation slots (CAS), call establishment channels (CEC), and loop signaling channels (LSC). The TCH is a dedicated channel assigned to a given fixed or mobile terminal. The ASC conveys information between the earth station and a terminal on an as needed basis for handovers or call terminations, with the ASC replacing the TCH. The BCC broadcasts information required by a terminal to determine the proper beam to monitor for pages (when a terminal is called) and to use for requesting access to the system (when a terminal initiates a call).

The FSC is a common signaling channel that is monitored by multiple users for information such as pages (PAS) addressed to particular users and channel allocation slots (CAS). The PAS notifies a particular terminal of an incoming call. The CAS informs a terminal of a CEC that the terminal should use for call setup, as well as information required to bring the terminal into synchronization. The CEC exchanges call setup information between the terminal and earth station. The LSC contains control loop information for characteristics of the waveform, such as frequency, chip timing and transmission power.

The return terminal link spectrum may be divided into multiple subbands (e.g., 58), from which a subset of subbands (e.g., 38) may be used. The terminals correct frequency and timing of the return link subbands based initially on correction information transmitted over the CAS with the LSC used to maintain synchronization. As in the forward link, each subband may support multiple (e.g., 80) channels for individual terminals.

The return feeder link spectrum may be divided into multiple feeder channels (e.g., 122), one of which may be devoted to satellite telemetry. The terminals adjust the carrier frequencies as commanded via the LSC to compensate for the Doppler effect in order to maintain synchronization between satellites sharing the satellite.

The return link supports traffic channels (TCH), return associated signaling channels (ASC), a measurement reporting channel (MRC), a return loop signaling channel (LSC) a return call establishment channel (CEC), and a return access channel (RAC). The TCH, ASC and CEC perform the same functions as in the forward link. The MRC transmits environment data to earth stations regarding signal quality in potential handover candidate beams. The LSC reports the received signal quality measured on the forward link traffic channel. The RAC carries nonsynchronous spread spectrum pseudo-noise (PN) signal access bursts which are used by terminals to initially access the communications system.

DETAILED DESCRIPTION OF THE INVENTION

INDEX OF SECTIONS

| | | Page |
|---|---|---|
| 1.0 | OVERVIEW | 16 |
| 2.0 | FORWARD LINK WAVEFORM FREQUENCY PLAN | 22 |
| 3.0 | FORWARD LINK CHANNEL TYPES | 27 |
| 4.0 | WAVEFORM STRUCTURE | 34 |
| 5.0 | MODULATION FORMAT | 34 |
| 6.0 | SUBSCRIBER PRIVACY | 35 |
| 7.0 | FORWARD LINK ERROR CORRECTION CODING | 36 |
| 8.0 | INTERLEAVING | 46 |
| 9.0 | RATE ADAPTION | 48 |
| 10.0 | VOICE AND DATA ACTIVITY | 48 |
| 11.0 | FORWARD SPECTRAL MASK | 50 |
| 12.0 | FORWARD LINK FRAME AND FIELD STRUCTURE | 51 |
| 13.0 | RETURN LINK WAVEFORM | 69 |
| 14.0 | CHANNEL TYPES | 77 |
| 15.0 | WAVEFORM STRUCTURE AND MODES | 82 |
| 16.0 | MODULATION FORMAT | 83 |
| 17.0 | POWER LEVELS | 88 |
| 18.0 | RETURN LINK SUBSCRIBER PRIVACY | 88 |
| 19.0 | RETURN LINK ERROR CORRECTION CODING | 90 |
| 20.0 | INTERLEAVING | 100 |
| 21.0 | VOICE AND DATA ACTIVITY | 102 |
| 22.0 | RETURN SPECTRUM | 104 |
| 23.0 | RETURN LINK FRAME AND FIELD STRUCTURE | 104 |
| 24.0 | RETURN ACCESS CHANNEL (RAC) WAVEFORM | 119 |

1.0 Overview

Figure 1:
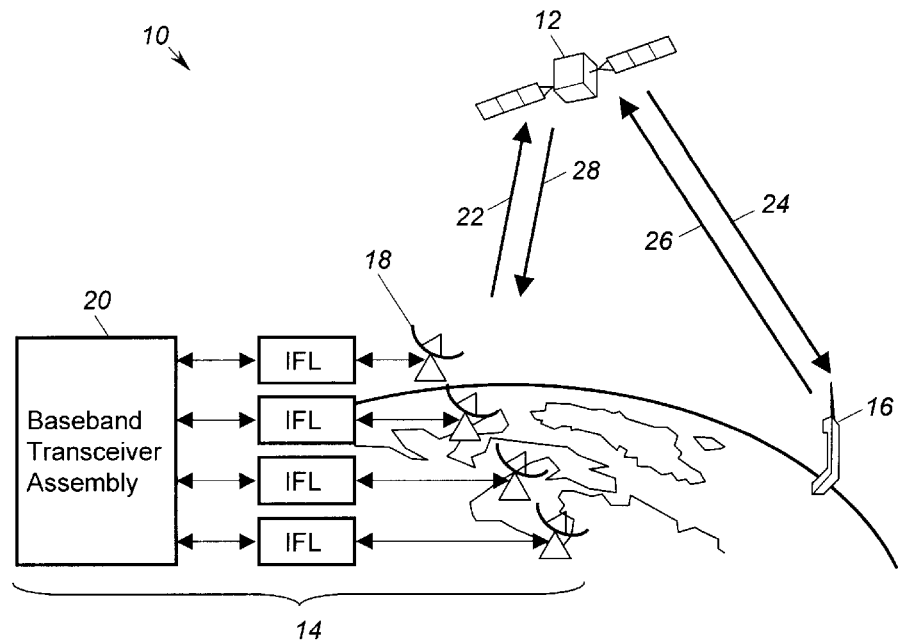
FIG. 1 generally illustrates a block diagram of a satellite based telecommunications system according to a preferred embodiment of the present invention.

FIG. 1 generally illustrates a satellite-based telecommunications system 10 according to the preferred embodiment of the present invention. The system 10 includes at least one satellite 12, an earth station 14 and a mobile or fixed terminal 16. The earth station 14 includes at least one antenna 18 and a baseband transceiver or modem assembly 20. The earth station 14 communicates with terminals 16 along forward and return links. The forward link includes a forward feeder link 22 from the earth station 14 to the satellite 12 and a forward terminal link 24 from the satellite 12 to the terminal 16. The return link includes a return terminal link 26 from the terminal 16 to the satellite 12 and a return feeder link 28 from the satellite 12 to the earth station 14.

The satellite 12 includes at least one antenna which defines a coverage area of the satellite 12 upon the earth surface. The coverage area is formed from multiple beam spots arranged adjacent to one another on the earth's surface. Within each beam spot, the satellite transmits and receives voice and data signals in the traffic channels carried along multiple predefined frequency subbands. By way of example only, four to six frequency subbands may typically be assigned to each beam spot. Each subband may support multiple communications channels.

The forward link waveform format includes multiple types of communications channels, such as traffic channels, associated signaling channels, broadcast control channels, forward signaling channels, call establishment channels and loop signaling channels. The forward signaling channel includes paging slots and channel allocation slots. The return link waveform format also supports multiple types of communications channels, such as traffic channels, associated signaling channels, measurement reporting channels, return loop signaling channels, return call establishment channels and return access channels. The foregoing channel types are discussed in more detail below.

Traffic channels may carry various types of signals, such as voice signals and data signals being transmitted at varying data rates. Generally, data signals are combined with a protocol unique to the type of data being transmitted. Earth station 14 and terminal 16 may be configured to transmit various types of data at various rates, and thus, the subject invention is not limited to the particular exemplary data rates discussed in connection with the preferred embodiment.

Figure 2:
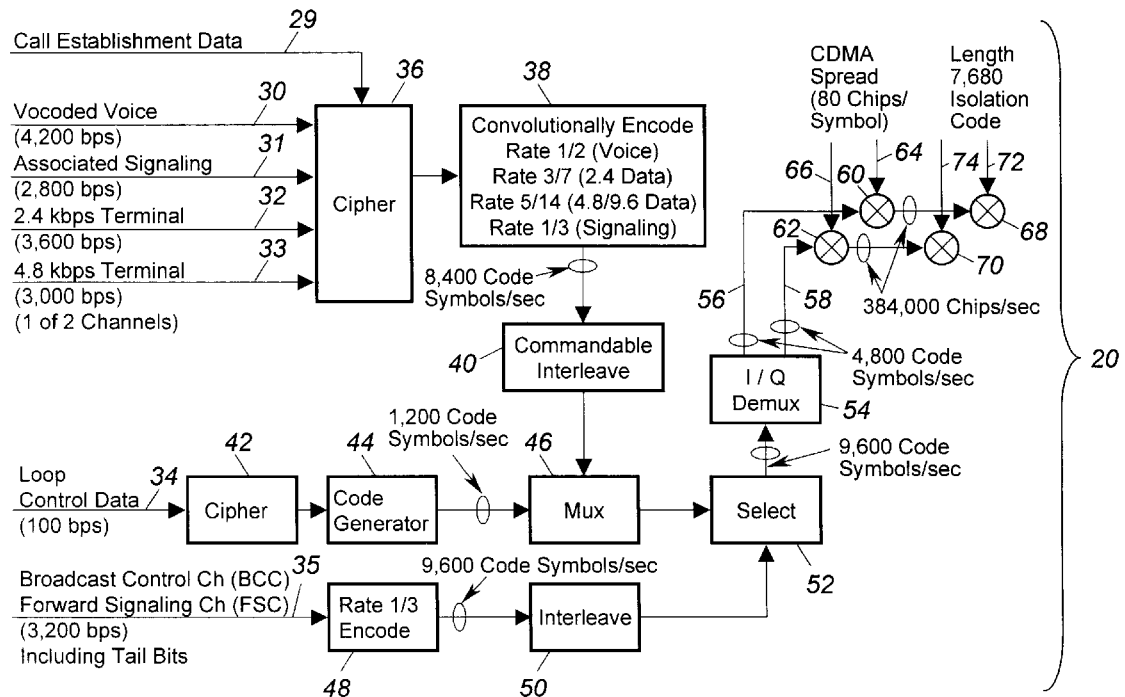
FIG. 2 illustrates a block diagram of a modem assembly of an earth station.

FIG. 2 illustrates a block diagram of the modem assembly 20 in an earth station 14 which generates communications channels in the forward feeder link. The modem assembly 20 includes multiple input lines 29–35 for receiving voice information bits (line 30), signaling data associated with the voice or data channels (line 31), data information bits at first or second rates (lines 32 or 33), loop control data (line 34) and broadcast control and forward signaling data (line 35).

The modem assembly 20 may also receive call establishment data on line 29. Only one of input lines 29–33 operates at any given instant in time depending upon the current mode of the terminal (e.g., a voice mode, a data mode, etc.). The input lines 29–33 communicate with a cipher module 36 which may perform ciphering upon the input signal. The cipher module 36 provides a ciphered information bit stream to a convolutional encoder 38 which performs convolutional encoding at one of several predefined code rates upon the input signal. The code rate depends upon the type of information bit stream (e.g., voice, data). The encoder 38 outputs code symbols based on the input information bit stream. The code symbols are supplied to a block interleaver 40, which performs an interleave function as explained below in connection with FIG. 10.

The loop control data is supplied upon line 34 to a cipher module 42. The ciphered loop control data is supplied to a code generator 44 which produces code symbols based on ciphered loop control data. The code symbols output from code generator 44 and block interleaver 40 are combined by multiplexor (MUX) 46. Line 35 inputs one of broadcast control data or forward signaling data which is converted to code symbols in encoder 48. The code symbols are supplied to a block interleaver 50. The outputs of the multiplexor 46 and interleaver 50 are applied to a selector 52 which selects one of the inputs for transmission to an in phase/quadrature demultiplexor 54. The demultiplexor 54 separates the incoming signal into an in-phase channel 56 and a quadrature phase channel 58. The in-phase and quadrature channels 56 and 58 are supplied to modulators 60 and 62, respectively, and modulated with a staggered CDMA chip code supplied on lines 64 and 66, respectively. By way of example, the CDMA chip code may have a rate of 80 chips per code symbol. The outputs of modulators 60 and 62 are again modulated in modulators 68 and 70 with an isolation code supplied on lines 72 and 74, respectively. The outputs of modulators 68 and 70 are supplied to a channel summation and modulation module 260 shown in FIG. 11.

Figure 11:
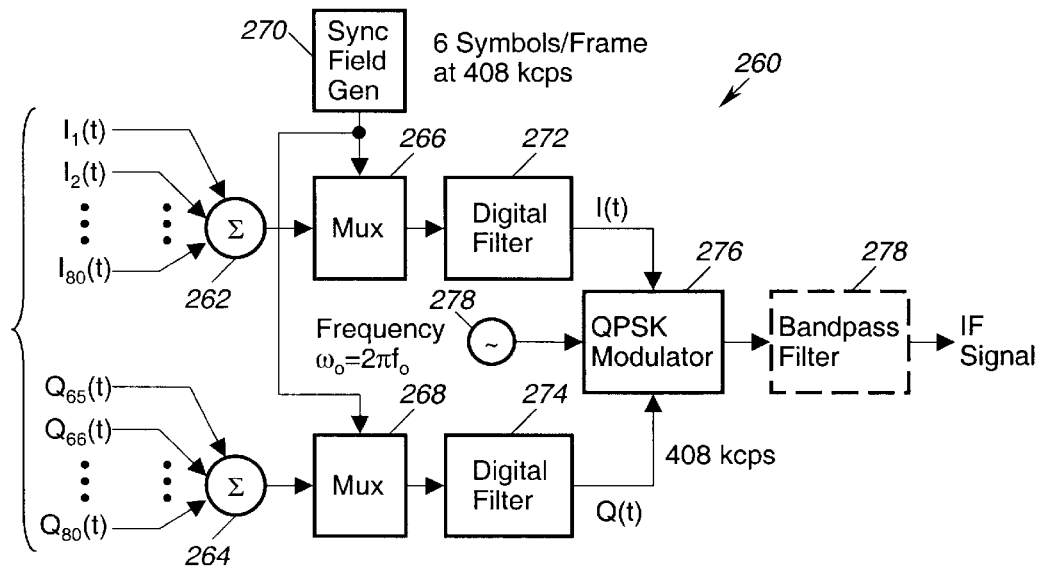
FIG. 11 illustrates a block diagram of the channel summation and modulation module for generating one subband.

FIG. 11 illustrates a channel summation and modulation processor 260 for a subband. The processor 260 includes summers 262 and 264. The summer 262 combines the in-phase channel for all terminals assigned to the subband. Summer 264 combines the quadrature phase channels for all terminals assigned to the subband. The outputs of summers 262 and 264 are supplied to multiplexors 266 and 268, respectively, for combination with the sync field signal from a sync field generator 270, thereby synchronizing the sync field with all traffic channels in the subband. The outputs of multiplexors 266 and 268 are supplied to digital filters 272 and 274 for filtering. The filters 272 and 274 output filtered signals from the in-phase channel and quadrature-phase channel to the QPSK modulator 276 for combination with a signal from an oscillator 278. The output of the QPSK modulator 276 is passed through a bandpass filter and output as an intermediate frequency (IF) signal. The IF signal may be modulated with a higher frequency prior to transmission from the antenna of the earth station.

During operation, each subscriber channel is assigned a unique code word from the set of length 80 orthogonal codewords. Each code symbol in the multiuse portion of a frame is multiplied by one repetition of the codeword, thereby producing a chip rate equal to 408,000 chips per second during the multiuse field of the frame. A sync field also contains chips clocked at 408,000 chips per second. However, the orthogonal code from the set of codewords is not modulated with the sync field portion of the frame. The code words within the set are numbered from 0–79. Codeword 0 consists of a sequence of 80 "1" chips. The remaining code words consist of a "1" chip followed by a quadrature residue sequence of 79 chips. An exemplary set of codewords according to the preferred embodiment of the present invention is set forth in Table 1 below. Exemplary chip values for code word #1 are set forth in Table 2. The chips are transmitted over the air interface beginning with chip 0.

TABLE 1

| Codeword | Chip Number | | | | | | | | | |
|---|---|---|---|---|---|---|---|---|---|---|
| Number | 0 | 1 | 2 | 3 | 4 | | 75 | 76 | 77 | 78 |
| 0 | 1 | 1 | 1 | 1 | 1 | ... | 1 | 1 | 1 | 1 |
| 1 | 1 | $C_1$ | $C_2$ | $C_3$ | $C_4$ | ... | $C_{75}$ | $C_{76}$ | $C_{77}$ | $C_{78}$ |
| 2 | 1 | $C_2$ | $C_3$ | $C_4$ | $C_5$ | ... | $C_{76}$ | $C_{77}$ | $C_{78}$ | $C_{79}$ |
| ... | | | | | | | | | | |
| 78 | 1 | $C_{78}$ | $C_{79}$ | $C_1$ | $C_2$ | ... | $C_{73}$ | $C_{74}$ | $C_{75}$ | $C_{76}$ |
| 79 | 1 | $C_{79}$ | $C_1$ | $C_2$ | $C_3$ | ... | $C_{74}$ | $C_{75}$ | $C_{76}$ | $C_{77}$ |

TABLE 2

| $C_0$ | $C_1$ | $C_2$ | $C_3$ | $C_4$ | $C_5$ | $C_6$ | $C_7$ | $C_8$ | $C_9$ | $C_{10}$ | $C_{11}$ |
|---|---|---|---|---|---|---|---|---|---|---|---|
| 1 | 0 | 1 | 1 | 0 | 1 | 1 | 0 | 0 | 1 | 1 | 1 |
| $C_{12}$ | $C_{13}$ | $C_{14}$ | $C_{15}$ | $C_{16}$ | $C_{17}$ | $C_{18}$ | $C_{19}$ | $C_{20}$ | $C_{21}$ | $C_{22}$ | $C_{23}$ |
| 1 | 0 | 1 | 0 | 0 | 1 | 0 | 1 | 1 | 1 | 1 | 1 |
| $C_{24}$ | $C_{25}$ | $C_{26}$ | $C_{27}$ | $C_{28}$ | $C_{29}$ | $C_{30}$ | $C_{31}$ | $C_{32}$ | $C_{33}$ | $C_{34}$ | $C_{35}$ |
| 1 | 0 | 1 | 1 | 0 | 0 | 0 | 0 | 1 | 1 | 0 | 0 |
| $C_{36}$ | $C_{37}$ | $C_{38}$ | $C_{39}$ | $C_{40}$ | $C_{41}$ | $C_{42}$ | $C_{43}$ | $C_{44}$ | $C_{45}$ | $C_{46}$ | $C_{47}$ |
| 0 | 1 | 0 | 1 | 0 | 1 | 0 | 1 | 0 | 1 | 1 | 1 |
| $C_{48}$ | $C_{49}$ | $C_{50}$ | $C_{51}$ | $C_{52}$ | $C_{53}$ | $C_{54}$ | $C_{55}$ | $C_{56}$ | $C_{57}$ | $C_{58}$ | $C_{59}$ |
| 0 | 0 | 1 | 1 | 1 | 1 | 0 | 0 | 1 | 0 | 0 | 0 |
| $C_{60}$ | $C_{61}$ | $C_{62}$ | $C_{63}$ | $C_{64}$ | $C_{65}$ | $C_{66}$ | $C_{67}$ | $C_{68}$ | $C_{69}$ | $C_{70}$ | $C_{71}$ |
| 0 | 0 | 0 | 1 | 0 | 1 | 1 | 0 | 1 | 0 | 0 | 0 |
| $C_{72}$ | $C_{73}$ | $C_{74}$ | $C_{75}$ | $C_{76}$ | $C_{77}$ | $C_{78}$ | $C_{79}$ | | | | |
| 0 | 1 | 1 | 0 | 0 | 1 | 0 | 0 | | | | |

To produce a more noise-like waveform, the sequence of orthogonal codewords are multiplied by an isolation code prior to using the chip sequence. The same code is applied to the in-phase and quadrature-phase code symbols, which is equivalent to BPSK spreading. The isolation code corresponds to the length of the multiuse field, such as 7,680 chips. The same 7,680-chip isolation code may be used by all CDMA channels in the system (including broadcast signaling channels). The isolation code begins immediately after the sync field and ends at the end of the frame. Neither the orthogonal codeword nor the isolation code need be applied to the sync field.

Figure 12:
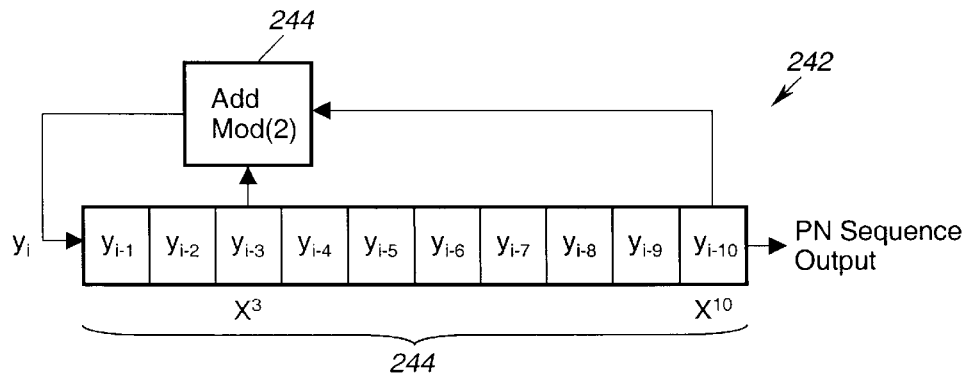
FIG. 12 illustrates a block diagram of an isolation code generator.

FIG. 12 illustrates a block diagram of the isolation code generator 242. The isolation code may be generated by truncating eight repetitions of a 1,023-chip PN sequence. The PN sequence is characterized by the primitive polynomial $X^{10}+10^{13}+1$. This corresponds to the recursion $y_i = y_{i-3} \oplus y_{i-10}$, where $\oplus$ indicates mod-2 addition at block 244. The shift register 242 is initialized with the first 10 chip values: $y_1$ through $y_{10}$ set to {1001001001} respectively. This corresponds to i=11 in FIG. 12. The recursion is then used to generate $y_{11}$ through $7_{7680}$.

2.0 Forward Link Waveform Frequency Plan

Figure 3:
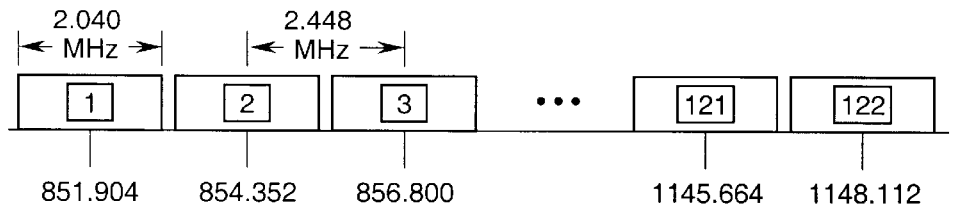
FIG. 3 illustrates a forward baseband feeder spectrum.

Next the waveform frequency plan for the forward link is described. The forward link uses orthogonal direct-sequence, code division multiple access (ODS-CDMA) to minimize multiple access self-interference. As shown in FIG. 3, the forward feeder baseband spectrum may have a 300 MHz passband nominally extending from 850.884 MHz to 1149.132 MHz. The feeder baseband spectrum may be divided into 122 feeder channels numbered from 1 to 122, and centered as shown below in Table 3.

TABLE 3

| Feeder Channel | Center Frequency (MHz) |
|---|---|
| 1 | 851.904 |
| N(1 ≤ N ≤ 122) | 849.456 + 2.448 × N |
| 122 | 1148.112 |

The frequency and channel spacing may be adjusted by the earth station 14 to compensate for Doppler effects caused by satellite motion. This is necessary to maintain synchronization between earth stations sharing a satellite. Feeder channels number 17 and 18 may not carry user traffic but may be instead occupied by pilot tones used to combine users on multiple feeder links with the correct relative power. The command uplink frequency subband may be located below feeder channel 1. The command uplink frequency carries commands to the satellite 12, enabling the earth station 14 to communicate with the satellite 12.

Optionally, the frequency plan illustrated in FIG. 3 may be modified to delete subband 1 in feeder channel 1 and/or to use a narrower channelizer filter in the satellite 12 to ensure adequate filtering of the command uplink frequency subband. By way of example only, the channelizer in the satellite may be configured as set forth in co-pending application Ser. Nos. 08/629,860 and 08/636,366, filed Apr. 9, 1996 and Apr. 23, 1996, respectively. The '860 and '366 applications are assigned to the Assignee of the present application and expressly incorporated herein by reference. Removing the lowest subband from channel 1 provides a larger buffer frequency range between the command uplink and the communications channels which prevents retransmission by the satellite along the forward terminal link 24. As a further option, subband 4 in feeder channel 122 may also need to be deleted if subband 4 would extend beyond the allocated frequency range. Each feeder channel may contain multiple active subbands, such as four or six, depending upon the available bandwidth. By way of example, if six subbands are used per feeder channel they may be spaced at 3,264 KHz.

Figure 4:
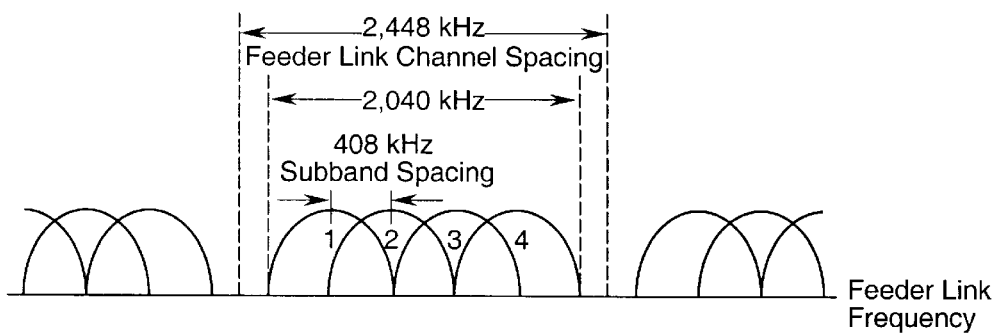
FIG. 4 illustrates subband distribution within a feeder channel in the forward baseband feeder spectrum.

FIG. 4 illustrates the subband locations within an exemplary feeder channel. Prior to transmission on the forward feeder link 22 (FIG. 1), the baseband spectrum of FIG. 3 is unconverted in the earth station 14 with a local oscillator oscillating at nominal value of 28,250.940 MHz to the forward feeder link spectrum.

Figure 5:
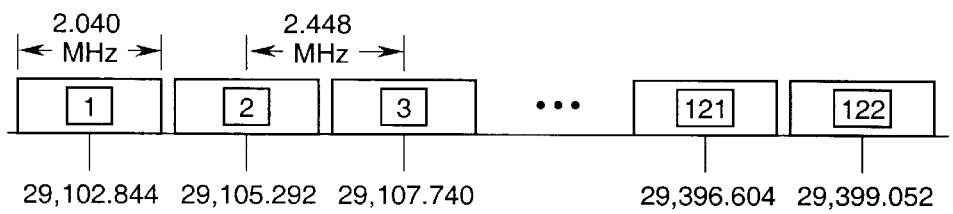
FIG. 5 illustrates a forward feeder link spectrum at the satellite.

FIG. 5 illustrates the forward feeder link spectrum at the satellite 12 which extends from 29,100 MHz to 29,400 MHz. The feeder link spectrum maintains the same 122 feeder channels of the baseband spectrum. Table 4 below gives the feeder channel numbering scheme. The center frequency and spacing between feeder channels transmitted may be adjusted by the earth station 14 to compensate for Doppler effects caused by satellite motion. These adjustments produce the channel center frequency and feeder channel spacing of FIG. 5 at the satellite 12 in order to maintain synchronization between the earth stations sharing the satellite 12. For a range rate of v between the satellite 12 and earth station 14, each of the center frequencies listed in Tables 3 and 4 are multiplied by 1-(v/c), where c is the speed of light. The maximum range rate between the earth station and the satellite is $\pm 2 \times 10^{-5}$ times the speed of light. This corresponds to a maximum Doppler shift of approximately ±600 kHz.

TABLE 4

| Feeder Channel | Center Frequency (MHz) |
|---|---|
| 1 | 29102.844 |
| N | 29100.396 + 2.448 × N |
| 122 | 29399.052 |

Figure 6:
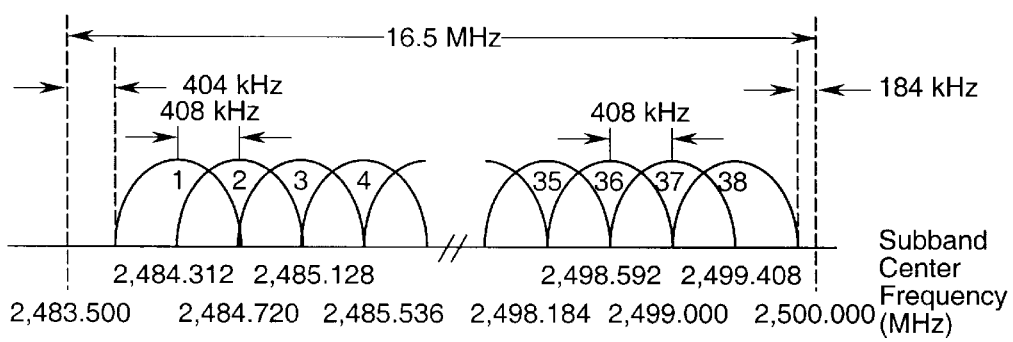
FIG. 6 illustrates the forward terminal link subband spectrum at the satellite.

Each feeder channel is translated in frequency by the satellite and routed to a specific beam. The frequency translation is such that the four subbands depicted in FIG. 4 can be placed in any four contiguous subbands on the forward terminal link. As shown in FIG. 6, the transmitted forward terminal link may have a 16.5 MHz passband extending from 2,483.5 MHz to 2,500 MHz. This spectrum may be divided into 38 subbands with 408 kHz center-to-center spacing.

Table 5 lists the transmitted center frequency for the 38 subbands in the forward terminal link spectrum. Guard bands of 404 kHz and 184 kHz are located at the bottom and top, respectively, of the 16.5 MHz allocation to avoid interference from transmissions outside the system. Each subband may have 80 ODS-CDMA channels available for use by terminals 16. Doppler effects due to satellite motion will cause the frequency received by a terminal to differ from the values in FIG. 6. Mobile link Doppler is not compensated on the forward link, since it does not adversely affect the orthogonality of the waveform. For a range rate of v between the satellite and terminal, each of the center frequencies listed in FIG. 6 and Table 5 are multiplied by 1-(v/c), where c is the speed of light. The maximum range rate between the user terminal and the satellite is $\pm 1 \times 10^{-5}$ times the speed of light. This corresponds to a maximum Doppler shift of approximately ±25 kHz.

TABLE 5

| Subband | Center Frequency (MHz) |
|---|---|
| 1 | 2484.312 |
| N | 2483.904 + 0.408 × N |
| 38 | 2499.408 |

3.0 Forward Link Channel Types

The types of channels transmitted over the forward link are discussed below in more detail. Each communications channel is divided into frames prior to transmission. Each frame includes one or more fields discussed below. The channel types include traffic channels, associated signaling channels, broadcast control channels, forward signaling channels, call establishment channels and loop signaling channels. The forward signaling channel includes paging slots and channel allocation slots.

Prior to describing the individual channels, examples are provided for establishment a terminal terminated call and for establishing a terminal originated call.

Initially, when a terminal is turned on, the terminal searches the frequency spectrum set forth in FIG. 6 and identifies one or more broadcast control channels which may be monitored by the terminal. The terminal selects one of the detectable broadcast control channels based on a predetermined criteria, such as the broadcast control channel having the strongest signal quality, the last broadcast control channel used, the broadcast control channel assigned to a particular geographic area or some other criteria. The terminal monitors thee selected broadcast control channel to determine which forward signaling channel should be monitored by the terminal for pages and for attempting to access the system. The terminal then monitors the identified forward signaling channel.

When a page message appears over the forward signaling channel addressed to the particular terminal, the terminal transmits over an asynchronous return access channel (RAC) a signaling burst indicating that the terminal has detected the page. Responsive to the RAC signaling burst from the terminal, the earth station transmits, over the forward signaling channel in the channel allocation slots, a channel assignment for the particular terminal. The terminal detects the channel assignment from the channel allocation slots in the forward signaling channel and, responsive thereto, begins monitoring the assigned channel. The assigned channel corresponds to a call establishment channel which may be uniquely assigned to a particular terminal or, alternatively, configured as a group call establishment channel for use by multiple terminals while establishing a call.

Once the terminal tunes to the call establishment channel (CEC), the earth station and terminal transmit call setup information therebetween over the CEC establishing a traffic channel between the earth station and terminal. When the call establishment channel is utilized as a designated channel for a single terminal, the call establishment channel may be later converted to a traffic channel. In this case, the frequency and timing of the call establishment channel are reallocated to the traffic channel, while the channel formats are converted from a call establishment channel format to a traffic channel format.

Alternatively, when the call establishment channel is utilized as a group resource for multiple terminals, traffic channels for each terminal differ from the call establishment channel.

For a terminal initiated call the foregoing process is substantially repeated. However, the terminal initiates the call by transmitting a signaling burst without previously having received a paging message.

The traffic channel represents a dedicated channel assigned to a particular terminal 16. The traffic channel may carry voice or data signals at any desired rate supportable by the system. By way of example only, the traffic channel may transmit voice coded data at a rate of 4200 bps and having a bit error ratio (BER)<$10^{-3}$. Alternatively, the traffic channel may carry data at a rate of 3600 bps with a BER<$10^{-5}$ (comprising subscriber data transmitted at 2400 bps and protocol data transmitted at 1200 bps for a V.110 protocol). Alternatively, the traffic channel may transmit digital data at 3000 bps with a BER<$10^{-5}$ (comprising subscriber data transmitted at 2400 bps and protocol data transmitted at 600 bps per channel). As a further alternative, the terminal may transmit voice signals and data at higher transmission rates (e.g., 4800 and 9600 bps) through the use of more than one channel.

The associated signaling channel is transmitted at the same frequency and timing and with the same CDMA code as the traffic channel. The associated signaling channel (ASC) interrupts and is transmitted in place of the traffic channel (TCH). The associated signaling channel conveys signaling information from the earth station 14 to the terminal 16 during interrupts in dedicated traffic channel (TCH), such as during call setup, call termination and call registration. The ASC includes three consecutive frames transmitted as an interrupt in the traffic channel at a given time to carry signaling information. The signaling information may include 112 bits of signaling data sent with a BER<$10^{-5}$. The format of the signaling channel is provided below and discussed in connection with FIG. 16. The ASC may transmit progress indicators, call establishment messages, handover messages, channel release messages and the like. The handover messages may include receive assignment commands, receive assignment completion, receive assignment failure, transmit assignment complete, transmit assignment failure, transmit assignment acknowledge and transmit assignment negative acknowledgment.

The broadcast control channel (BCC) broadcasts information required by a terminal 16 to determine the appropriate beam and frequency to monitor for pages and to use for attempts to access the system. The control channel information includes location areas covered by the beam containing the subband carrying the BCC and frequencies to use for access attempts based on these location areas. The BCC also identifies subbands for adjacent beams carrying a BCC. The BCC data is transmitted in a variable length message which repeats 2 to 4 times a second, depending on the traffic demand placed on the satellite at a given time. The BCC may have a throughput of 3200 bps with a BER<$10^{-5}$. Each beam may transmit one BCC which is supplied by the earth station. When more than one earth station shares a satellite, one is designated by the master earth station and transmits the BCC. Each BCC is assigned a general CDMA code known to all terminals to enable the terminals to access the BCC. No ciphering need be used on the BCC.

The Forward Signaling Channel (FSC) is a common signaling channel that is monitored by multiple user terminals. Each beam may include one or more FSC. When earth stations share a satellite, each earth station transmits at least one FSC. The FSC contains information addressed to particular user terminals. Each frame of the FSC may be divided into multiple (e.g., 10) paging slots and multiple (e.g., 6) channel assignment slots, as described below. Like the BCC, no ciphering need be used on the FSC. If traffic conditions warrant, more than one FSC may be assigned to an earth station. The BCC data, combined with the subscribers registration information, uniquely identifies which of these FSC that a subscriber is to monitor.

The Paging Slot (PAS) is used to notify terminals of an incoming call. Paging is performed by transmitting a paging message containing a subscriber's Temporary Mobile Subscriber Identify (TMSI). Two such TMSI pages may be transmitted in a 40 ms paging slot. The particular slot within the FSC frame used to page a particular subscriber is determined by the subscriber's IMSI (International Mobile Subscriber Identity), enabling a terminal to listen only during its assigned slot. This procedure extends terminal battery life. The paging slot may have a throughput of 3200 bps with a BER<$10^{-5}$.

The Channel Allocation Slot (CAS) within the FSC may be used to assign a terminal to a call establishment channel. One assignment command may be transmitted in a 40 ms slot. The assignment command includes a random identifier (received from the terminal in a RAC burst), the frequency, timing and CDMA code for the call establishment channel, and any additional synchronization information. If a particular FSC slot intended for use as a PAS contains no pages, it may be converted for use as a CAS in lieu of waiting for the next FSC slot dedicated to channel assignments. The CAS may have a throughput of 3200 bps with a BER<$10^{-5}$.

The Call Establishment Channel (CEC) may be used to convey the call setup information, such as caller verification data, ciphering data messages, call destinations and the like. At the conclusion of a successful call setup, including the ringing interval, the terminal is assigned to a traffic channel. Unlike the associated signaling channel, there is no need to switch back and for between the CEC and a traffic channel. This permits devoting 5 information octets of the initial frame in a three-frame CEC burst to signaling information, instead of devoting the frame entirely to a transition frame. The increased message length per burst (14 versus 9 for the ASC) allows most call setup messages to be transmitted in a single 3-frame burst. To increase circuit or channel capacity, the CEC may become a channel shared among multiple users. In this case, messages on the forward link CEC would be transmitted on demand on a queued basis, with the recipient identified in the message. Forward loop signaling would be slotted in a fixed manner, with one repetition of the loop signaling code word used instead of three, increasing the loop signaling throughput by a factor of three.

The loop signaling channel is not considered a channel in the network layer, since it performs its functions in the physical layer. The loop signaling channel contains control loop information for three characteristics of the waveform transmitted by the terminal: frequency, chip timing, and transmitted power. The earth station measures these characteristics in the return link and based thereon transmits a four-bit update to these three characteristics once each 120 msec. The loop signaling channel has a throughput of 100 bps with a BER<$10^{-3}$.

The earth station calculates power update information based on a code symbol error rate, chip timing error correction information based on a sync field and frequency offset error correction information based on a carrier tracking loop.

4.0 Waveform Structure

The overall Forward Link waveform is Frequency Division Multiplexed Orthogonal Code Division Multiple Access (OCDMA). Each subscriber channel (or circuit) is assigned one code from a set of orthogonal Quadratic Residue codes. Synchronization is accomplished by a sync field occurring in each 20 ms vocoder frame. Each subband may carry up to 80 separate Quadratic Residue codes and thus support up to 80 separate subscriber channels or circuits. The subbands are packed in a FDMA format for transmission to the satellite.

5.0 Modulation Format

Quadrature Phase Shift Keyed (QPSK) modulation is used by the earth stations, satellites and terminals. The QPSK modulation is defined for an IF or RF subband signal S(t) as follows:

$$S(t) = I(t) \cos \omega t + Q(t) \sin \omega t$$

where $\omega$ is the subband carrier frequency in radians/sec and t is time and where I(t)=in-phase modulating data, and Q(t)=quadrature modulating data.

The values of I(t) and Q(t) are the baseband modulating data values which are the sums of up to 80 subscriber channels in the subband. Every channel of all channel types has independently assignable transmit power in each field. The range of power is approximately 20 dB in steps of approximately 0.25 dB.

6.0 Subscriber Privacy

Returning to FIG. 2, the modem assembly 20 maintains subscriber privacy by ciphering, in ciphers 36 and 42, the multiuse field of the traffic channel frames and the loop control data. The ciphers 36 and 42 may perform several known ciphering functions such as the GSM cipher and the like. The cipher 36 may also cipher the CEC. However, the sync field, BSC and FSC need not be ciphered. The cipher key may be calculated from two pieces of information: (1) the user's authentication key which is known to the system, but not transmitted over the air interface, and (2) a random number transmitted over the Call Establishment Channel during the call setup. This approach prevents recording the response of a particular terminal and mimicking its response to a traffic assignment since the response is a function of the transmitted random number.

The cipher 36 may combine the cipher key and a TDMA frame number to create a 114 bit cipher sequence. The frames may be numbered from 0 to 2,715,647 within a hyperframe, as described below. The frame number within a hyperframe is broadcast over the Broadcast Control Channel. The two initial bits of the cipher are used to cipher the two loop signaling information bits. The information bits transmitted in the multiuse field of a frame are then ciphered using as many of the remaining bits of the cipher as are required (e.g., 84 bits for voice, 72 bits for 2.4 kbps data, 60 bits for 4.8/9.6 kbps data, and 64 bits for signaling).

7.0 Forward Link Error Correction Coding

Figure 7:
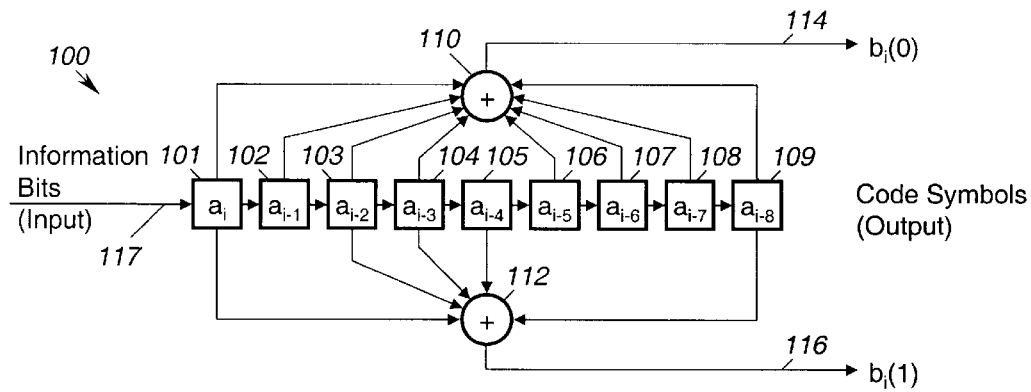
FIG. 7 illustrates a block diagram of a rate 1/2 encoder used in the modem assembly of FIG. 2.
Figure 8:
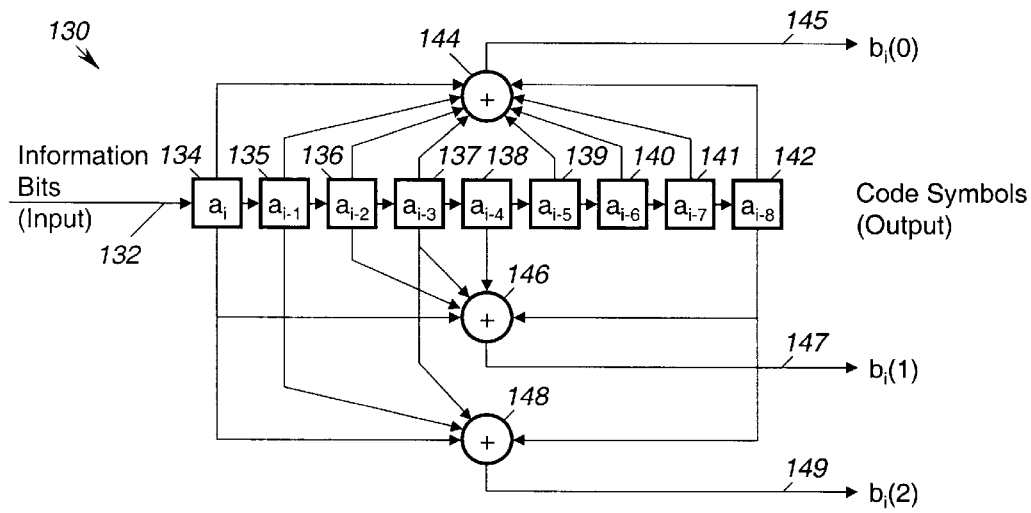
FIG. 8 illustrates a block diagram of a first rate 1/3 encoder used in the modem assembly of FIG. 2.
Figure 9:
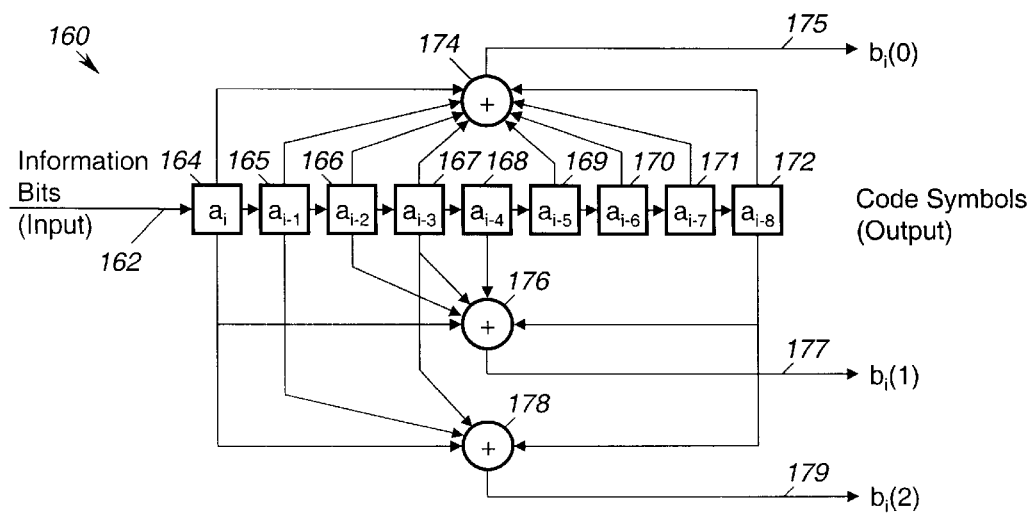
FIG. 9 illustrates a block diagram of a second rate 1/3 encoder used in the modem assembly of FIG. 2.

Turning to FIGS. 7–9, error correction coding is described for the forward link. FIGS. 7–9 illustrate block diagrams of exemplary encoders which may be used in encoder 38. FIG. 7 illustrates an encoder 100 which receives information bits along input line 117. The information bits shift serially through shift registers 101–109. Code generator 110 taps registers 101–104, 106, 108 and 109 to produce a code symbol representing the combination of "1"s and "0"s in these shift registers. Code generator 112 taps registers 101, 103–105 and 109 to produce a code symbol representative of the combination of "1"s and "0"s in these shift registers. The code generators 110 and 112 output code symbols on lines 114 and 116 to produce a rate 1/2 code (i.e., two code symbols per information bit received).

The encoder 100 receives and encodes vocoded voice data on line 30 (FIG. 2) at a 4.2 kbps information rate, which corresponds to 84 information bits per 20 msec frame. In FIG. 7, the information bits are denoted $a_1 \ldots a_{84}$, where $a_1$ is the first information bit received from the vocoder, and $a_{84}$ is the last. The voice data information bits are encoded by the convolution encoder 100 with a rate-1/2 convolutional code, producing 168 transmitted code symbols per frame. These code symbols are denoted $c_1 \ldots c_{168}$, where $c_1$ is the first code symbol in the frame and $c_{168}$ is the last.

The encoder 100 is constraint length 9 and is defined by the generator taps $g_0$=753 (octal) and $g_1$=561 (octal). The code symbol generator 100 generates code symbols, $b_i(0)$ and $b_i(1)$, from the information bits $\{a_i, \ldots, a_{i-8}$ serially input on line 117.

Subscripts less than 1 in $\{a_i, \ldots, a_{i-8}\}$ refer to the last information bits of the preceding active frame, with 84 added to the subscript to indicate the information bit location in the preceding frame. In the event that there is no preceding active frame (i.e., the preceding frame is a transition frame or an associated signaling channel frame) then information bits with subscripts less than one are 0.

The transmitted code symbols, $c_1 \ldots c_{168}$ are related to the $b_i(0)$ and $b_i(1)$ as illustrated below in Table 6.

TABLE 6

| Transmitted Code Symbol ($c_i$) Index | Transmitted Code Symbol |
| --- | --- |
| 1 | $b_1$ (0) |
| 2 | $b_1$ (1) |
| ... | ... |
| 167 | $b_{84}$ (0) |
| 168 | $b_{84}$ (1) |

FIG. 8 illustrates an encoder 130 used to encode data received on line 31 at 2.4 kbps along with related protocol data at 1.2 kbps. The protocol provides compatibility with the V.110 protocol. The net 3.6 kbps information rate of data and protocol corresponds to 72 information bits per 20 msec frame. The information bits are denoted $a_1 \ldots a_{72}$, where $a_1$ is the first information bit received by the encoder, and $a_{72}$ is the last.

The encoder 130 uses a rate-3/7 convolutional code, producing 168 transmitted code symbols per frame, the same as for vocoded data. These code symbols are denoted $c_1 \ldots c_{168}$, where $c_1$ is the first code symbol in the frame, and $c_{168}$ is the last. The encoder 130 receives the user data and protocol data serially along input line 132. The incoming data bits are stored in the shift registers 134–142. Generator 144 combines the data values in registers 134–137, 139, 141 and 142 to produce a code symbol on line 145. Generator 146 combines the bit values stored in registers 134, 136–138 and 142 to output a code symbol on line 147. Generator 148 combines the bit values stored in register 134–135, 137 and 142 to produce a code symbol 149. The code symbols on lines 145, 147 and 149 combine to form three code symbols generated by the encoder 130 per information bit value input to registers 134–142.

The rate-3/7 code is produced by puncturing a rate-1/3 constraint length 9 convolutional code. The rate-1/3 convolutional code is "punctured" by periodically omitting two from every nine convolution code symbols produced by the encoder 130. The location of code symbols that are omitted from the convolution code are chosen to achieve a code with the minimum error. The generators 144, 146 and 148 for the rate-1/3 code may be defined by the following notations: $g_0 = 753$ (octal), $g_1 = 561$ (octal) and $g_2 = 641$ (octal).

As illustrated in FIG. 8, the rate-1/3 code produces 3 code symbols, $b_i(0)$, $b_i(1)$, $b_i(2)$, from the information bits $\{a_i, \ldots, a_{i-8}\}$. According to the arrangement illustrated in FIG. 8, the encoder 130 produces three separate code symbols each time the information bits are shifted one register forward.

The information bits are received by the encoder 100 as a continual stream, even though subsequently divided into 20 msec frames prior to transmission. Consequently, some code symbols are generated based on information bits corresponding to consecutive 20 msec frames. Thus, information bits corresponding to the beginning portion of a current frame are encoded based in part on information bits corresponding to an ending portion of a preceding frame.

In FIG. 8, subscripts less than 1 in $\{a_i, \ldots, a_{i-8}\}$ refer to the last information bits of the preceding active frame, with 7 added to the subscript to indicate the information bit location in the preceding frame. In the event that there is no preceding active frame (i.e., the preceding frame is a transition frame or an associated signaling channel frame) then information bits with subscripts less than one are 0. Not all of these code symbols $b_i(k)$ are transmitted, however. By way of example only, the encoder may omit code symbols $b_2(2), b_3(2), b_5(2)$, etc. The transmitted code symbols, $c_1 \ldots c_{168}$, are related to the $b_i(k)$ as illustrated below in Table 7.

TABLE 7

| Transmitted Code Symbol ($c_i$) Index | Transmitted Code Symbol | Transmitted Code Symbol ($c_i$) Index | Transmitted Code Symbol |
|---|---|---|---|
| 1 | $b_1(0)$ | 6 | $b_3(0)$ |
| 2 | $b_1(1)$ | 7 | $b_3(1)$ |
| 3 | $b_1(2)$ | ... | ... |
| 4 | $b_2(0)$ | 167 | $b_{72}(0)$ |
| 5 | $b_2(1)$ | 168 | $b_{72}(1)$ |

FIG. 9 illustrates an encoder 160 used to encode user data received on line 33 (FIG. 2) at 4.8 kbps along with protocol data at 1.2 kbps. The protocol data ensures that the user data is transmitted in a format compatible with the V.1210 protocol. The transmission rates of the data and protocol combine to form a net 6.0 kbps transmission rate which is transmitted by the CEM channel generator over two CDMA channels operating at 3.0 kbps. In the example of FIG. 2, line 33 corresponds to one of the two channels supporting a transmission rate of 3.0 kbps.

Optionally, the modem assembly 20 may receive user data at 9.6 kbps over multiple transmission lines 33. The data transmitted at 9.6 kbps is combined with protocol data being transmitted at 2.4 kbps to produce a total transmission rate of 12.0 kbps. The combined data and protocol information may be divided into 4 separate CDMA channels by the CDMA channel generator and input over four separate lines resembling line 33 in FIG. 2 in order to produce the desired rate of 3.0 kbps per CDMA channel. The 3.0 kbps transmission rate per CDMA channel corresponds to 60 information bits per 20 msec frame per CDMA channel.

The information bits are denoted $a_1 \ldots a_{60}$, where $a_1$ is the first information bit received by the encoder 160, and $a_{60}$ is the last. The information bits are encoded with a rate-5/14 convolutional code, producing 168 transmitted code symbols per frame, the same as for vocoded data. These code symbols are denoted $c_1 \ldots c_{168}$, where $c_1$ is the first code symbol in the frame, and $c_{168}$ is the last.

The rate-5/14 code is produced by the encoder 160 in FIG. 9 by puncturing (or omitting part of) a rate-1/3 constraint length 9 convolutional code. The encoder 160 includes an input line 162 receiving the data and protocol information bits in a serial manner. Each bit is shifted through the shift registers 164–172. The values in shift registers 164–172 are combined by generators 174, 176 and 178 to produce code symbols at outputs 175, 177 and 179, respectively. The generator 174 produces a code symbol by combining the bit values in registers 164, 166, 167 and 169–172. The generator 176 generates code symbols based on the values in registers 164–165, 167–168 and 171–172. The generator 178 generates code symbols based on the values in registers 164–166, 169 and 172. The encoder 160 produces 3 code symbols (at lines 175, 177 and 179) based on the current information bits stored in registers 164–172 $\{a_i - a_{i-8}\}$, where it corresponds to the position of the information bit within a current frame.

As explained above, a single code symbol may be generated based on information bits from consecutive frames. For instance, the first for information bits from a current frame may be stored in registers 164–167, while the last five bits from the preceding frame may be stored in registers 168–172. Hence, subscripts less than 1 in $\{a_i, \ldots, a_{i-8}\}$ refer to the last information bits of the preceding active frame, with 60 added to the subscript to indicate the information bit location in the preceding frame. In the event that there is no preceding active frame (i.e., the preceding frame is a transition frame or an associated signaling channel frame) then information bits with subscripts less than one are 0. Not all of these code symbols $b_i(k)$ are transmitted, however. By way of example, the encoder may omit code symbols $b_5(0)$, $b_{10}(0), b_{15}(0)$, etc. The transmitted code symbols, $c_i \ldots c_{168}$, are related to the $b_i(k)$ as illustrated in Table 8.

TABLE 8

| Transmitted Code Symbol ($c_i$) Index | Transmitted Code Symbol | Transmitted Code Symbol ($c_i$) Index | Transmitted Code Symbol |
|---|---|---|---|
| 1 | $b_1(0)$ | 10 | $b_4(0)$ |
| 2 | $b_1(1)$ | 11 | $b_4(1)$ |
| 3 | $b_1(2)$ | 12 | $b_4(2)$ |
| 4 | $b_2(0)$ | 13 | $b_5(1)$ |
| 5 | $b_2(1)$ | 14 | $b_5(2)$ |
| 6 | $b_2(2)$ | ... | ... |
| 7 | $b_3(0)$ | 167 | $b_{60}(1)$ |
| 8 | $b_3(1)$ | 168 | $b_{60}(2)$ |
| 9 | $b_3(2)$ | | |

Returning to FIG. 9, the encoder may also be used to encode the broadcast signaling channel. The broadcast signaling channel may transmit data at be 3,200 kbps, including a QPSK ambiguity field and tail bits. This corresponds to 64 information bits per 20 msec (56 without the ambiguity field/tail bits). The information bits are denoted $a_1 \ldots a_{64}$, where $a_1$ is the first information bit received by the encoder, and $a_{64}$ is the last. The rate 1/3 convolutional encoder 160 produces 192 transmitted code symbols per frame. These code symbols are denoted by $c_1 \ldots c_{192}$, is the first code symbol in the frame, and $c_{192}$ last.

As illustrated in FIG. 9, the encoder 160 produces three code controls, $b_i(0)$, $b_i(1)$ and $b_i(2)$, per information bit $\{a_i, \ldots, a_{i-8}\}$. For subscripts i less than 1, $a_i$ is 0 in $\{a_i, \ldots, a_{i-8}\}$.

The transmitted code symbols, $c_1 \ldots c_{192}$, are related to the $b_i(k)$ as illustrated below in Table 9 for the BSC.

TABLE 9

| Transmitted Code Symbol ($c_i$) Index | Transmitted Code Symbol |
|---|---|
| 1 | $b_1$ (0) |
| 2 | $b_1$ (1) |
| 3 | $b_1$ (2) |
| ... | ... |
| 191 | $b_{64}$ (1) |
| 192 | $b_{64}$ (2) |

The forward signaling channels (the CEC and ASC) each use the subscriber portion of the multiuse field with signaling data. The encoder 160 of FIG. 9 may also be used to encode the ASC and CEC. The associated signaling channel data rate may be 2,800 kbps including eight tail bits transmitted at the end of a three frame burst. This corresponds to 56 information bits per 20 msec frame. The information bits are denoted $a_1 \ldots a_{56}$, where $a_1$ is the first information bit received by the encoder, and $a_{56}$ is the last. The encoder 160 produces 168 transmitted code symbols per frame, the same as for subscriber data. These code symbols are denoted $c_1 \ldots c_{168}$, where $c_1$ is the first code symbol in the frame, and $c_{168}$ is the last.

The encoder 160 generates three code symbols, $b_i(0)$, $b_i(1)$ and $b_i(2)$, per information bit $\{a_i, \ldots, a_{i-8}\}$. Subscripts less than 1 in $\{a_i, \ldots, a_{i-8}\}$ refer to the last information bits of the preceding active frame, with 56 added to the subscript to indicate the information bit location in the preceding frame. In the event that there is no preceding frame (i.e., the preceding frame is a transition frame) then information bits with subscripts less than one are 0. The transmitted code symbols, $c_1 \ldots c_{168}$, are related to the $b_i(k)$ as illustrated in Table 10 for the FSC and CEC.

TABLE 10

| Transmitted Code Symbol ($c_i$) Index | Transmitted Code Symbol |
|---|---|
| 1 | $b_1$ (0) |
| 2 | $b_1$ (1) |
| 3 | $b_1$ (2) |
| ... | ... |
| 167 | $b_{56}$ (0) |
| 168 | $b_{56}$ (1) |

The loop signaling channel transmits signaling information for each of the three loops (frequency, timing, power control) at a combined data rate of 100 bps. This provides a 4-bit update for each of the three loops once each 120 msec, or twice per 240 msec masterframe. This corresponds to two information bits per 20 msec frame.

Loop data may be transmitted continuously, even during periods of voice or data inactivity. In addition, because subbands may be shared between earth stations, the sync field may not necessarily be coherent with the data, making it an inappropriate source of carrier reference for coherent demodulation. Because of these factors, the loop data may be transmitted and demodulated using 4-ary Rademacher-Walsh modulation words. The first 12 QPSK symbols of the multiuse field may be used to carry these modulation words. The 24 code symbols comprising these 12 QPSK modulation symbols may be denoted $c_1 \ldots c_{24}$. The transmitted code symbols corresponding to the 4-ary Rademacher-Walsh modulation words are given in Table 11 for the forward loop signaling channel.

TABLE 11

| Transmitted Code Symbol ($c_i$) Index | Transmitted Code Symbol | | | |
|---|---|---|---|---|
| | 00 | 01 | 10 | 11 |
| 1–6 | 0 | 0 | 0 | 0 |
| 6–12 | 0 | 1 | 0 | 1 |
| 13–18 | 0 | 0 | 1 | 1 |
| 19–24 | 0 | 1 | 1 | 0 |

8.0 Interleaving

Figure 10:
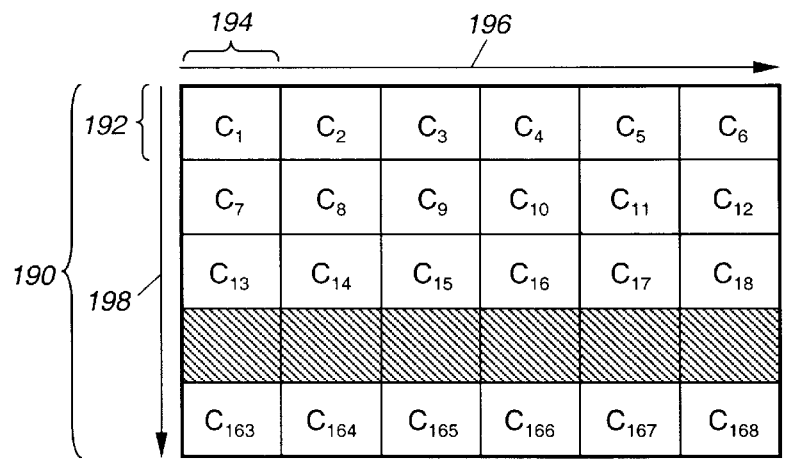
FIG. 10 illustrates a distribution of code symbols in a block interleaver used in the modem assembly of FIG. 2.

FIG. 10 illustrates an interleave arrangement for the code symbols while processed by the interleave modules 40 and 50 (FIG. 2). As noted above, the interleave module 40 may be turned off. By way of example only, the interleave module 40 may represent a 28 by 6 block interleaver wherein groups of six code symbols are stored in a block 190 (FIG. 10) of 28 rows 192 and 6 columns 194. The code symbols $c_1$–$c_{28}$ are consecutively stored in the rows 192 in the direction of arrow 196. Thereafter, the code symbols are read from block 190 in columns 192 in the direction of arrow 198. Thus, code symbols $c_1$, $c_7$, $c_{13}$, etc. are read out followed by code symbols $c_2$, $c_8$, $c_{14}$, etc.

The interleave module 50 may constitute a 32 by 6 block interleaver, wherein the rows 192 may each contain six broadcasts control channel data code symbols forward signaling channel data code symbols. The block may include 32 rows and six columns.

Optionally, the block interleavers 40 and 50 may be configured to be adjustable to combine code symbols for more than one frame. Thus, the block interleaver 40 may be modified to interleave 2, 6 or 12 frames. As a further alternative, the block interleavers may be modified to operate with different widths, such as 12, 36 or 72 code symbols per row. The number of code symbols per row will be based in part on the number of frames to be interleaved in a single operation.

The entire 192 code symbols of the multiuse field are interleaved for the BCC and FCC.

Figure 15:
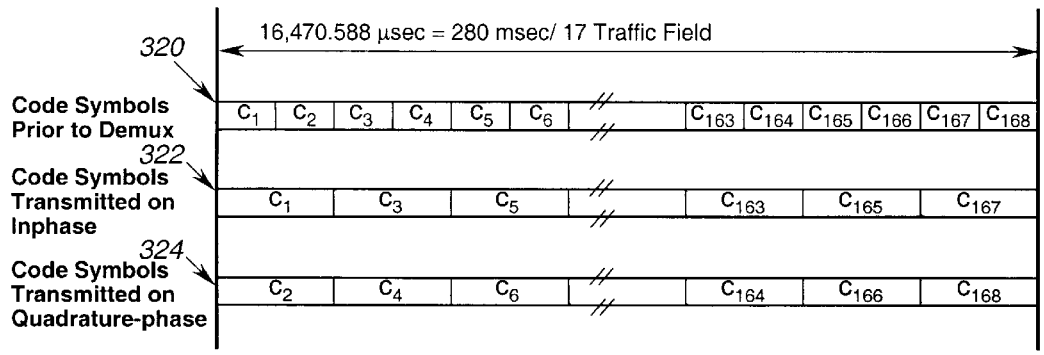
FIG. 15 illustrates the manner in which code symbols are demultiplexed into in-phase and quadrature phase channels.

With reference to FIGS. 2 and 15, the discussion turns to the demultiplexor module 54 (FIG. 2). As illustrated in FIG. 15, the demultiplexor 54 receives a continuous stream of code symbols 320. The stream of code symbols 320 is demultiplexed such that oddly numbered symbols 320 are transmitted in the in-phase channel 56 and evenly numbered symbols 324 are transmitted in the quadrature-phase channel 58. Thus, in-phase channel 56 includes code symbols 1, 3, 5 and the like. Quadrature-phase channel 58 includes code symbols 2, 4, 6 and the like.

9.0 Rate Adaption

The earth stations performs rate adaption for asynchronous data users by storing, in buffers, associated signaling interruptions, handover interruptions and changes in frame alignment due to stagger. The buffered data is transmitted at the end of the active period prior to the transition to an inactive state. Long term differences between the RF clock and the PSTN clock are accommodated by use of the bit stuffing inherent in the V.110 protocol. Rate adaption for voice users shall use the RF clock of the modem assembly to control frame timing of the vocoder in the TRAU of the earth station. For handovers, vocoder frames are dropped with the TRAU vocoder frame realigned to the new RF link vocoder frame when the link is resumed after the handover.

10.0 Voice and Data Activity

As noted above, voice and user data may be transmitted at various data rates. However, when no voice data or user data exists on the communications link, the earth station and terminal reduce the transmission rate to 0 bps. These periods of no data transmission occur during pauses within a conversation or data transmission. During these pauses, the earth station transitions or changes the traffic channel to an inactive state in which the waveform does not transmit traffic frames. The earth station switches the traffic channel between active and inactive states by transmitting transition frames. While in the inactive state, the earth station continues to transmit loop signaling information. Likewise, the waveform continues to transmit sync field data even when one or more of the voice or data channels are in an inactive state sense the sync field is shared by all users within a common feeder channel. Hence, the sync field must remain active for use with any frames containing voice data transmitted in the forward feeder link.

While the sync field may be located in the same feeder channel as related traffic channels, the sync field may be located within a different subband. Hence, referring to FIGS. 4 and 5, the sync field may be located within subband 1 of channel 2 while related traffic channels aligned with the sync field are located within subbands 2–4 of feeder channel 2.

Similarly, when transmitting data, the earth station switches the traffic channel between active and inactive states by transmitting frames therebetween. As noted above, when data is transmitted it may require that a separate protocol be transmitted therewith. When the data stream becomes inactive, the protocol information related to the data stream remains virtually unchanged. To minimize capacity needs, the earth station becomes inactive, transmission of the protocol when the data stream ceases and the waveform enters an inactive state. However, when the protocol changes state, even if during a period of data inactivity, the earth station switches the traffic channel to an active state and communicates the change in protocol state. Thereafter, the traffic channel switches to the inactive state.

As with voice channels, loop signaling channels remain active throughout the call regardless of the presence of data or the data activity state. Throughout data transmissions, the sync field also remains active.

11.0 Forward Spectral Mask

As illustrated in FIG. 4, a single feeder channel may include multiple subbands spaced at 408 kHz (the number depending on the frequency spectrum available). The subbands in a feeder channel may be generated digitally and then filtered as a group prior to combining the feeder channels. The filter has a 3 dB bandwidth which is approximately equal to the feeder channel spacing (2.448 MHz).

Each forward feeder channel is frequency shifted, filtered, routed to an individual beam, amplified, and transmitted on the forward terminal link. The group of four subbands in the feeder channel can be transmitted on any group of four continuous terminal link subbands depicted in FIG. 3. The filtering on the satellite is comparable to the baseband filtering, i.e., the 3 dB bandwidth is approximately equal to the feeder channel spacing.

12.0 Forward Link Frame and Field Structure

Figure 13:
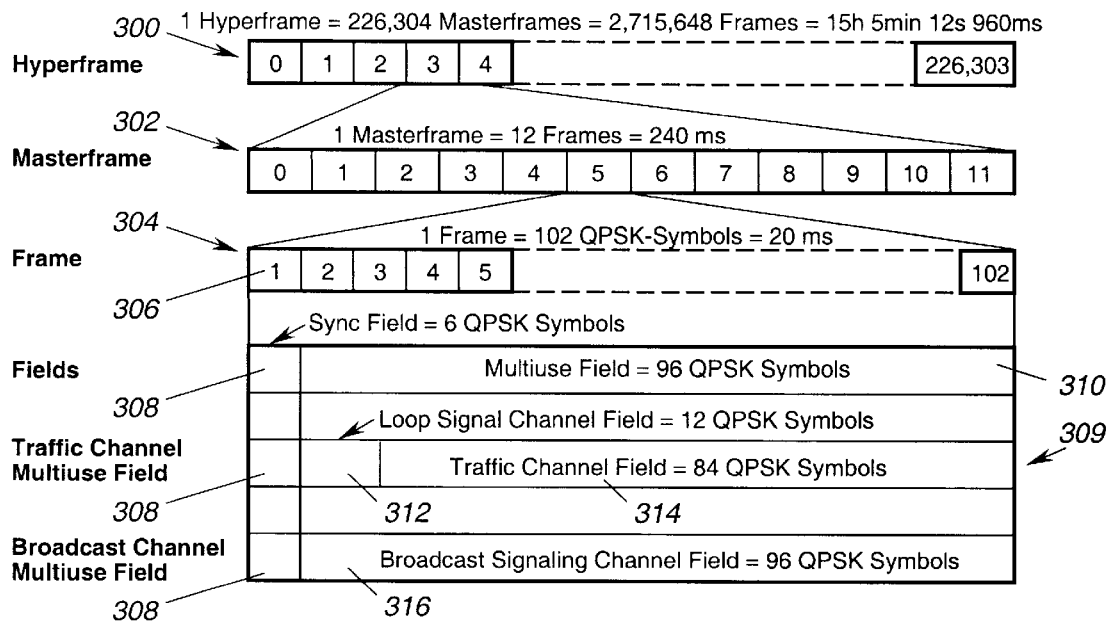
FIG. 13 illustrates a top level frame structure transmitted within the forward link.

Turning to FIG. 13, the structure of the frames and fields transmitted over the forward link by the earth stations and satellites is described. FIG. 13 illustrates the forward link frame and field structure. The earth stations transmit, over the forward link, hyperframes 300 comprising a plurality of master frames 302. Each master frame 302 includes a plurality of frames 304 which comprise a sequence of quadrature phase shift keying (QPSK) code symbols 306. The code symbols 306 within a frame 304 are partitioned into fields. The above discussed channel types utilize different field types in corresponding frames. Every frame within every channel type begins with a sync field 308 followed by a multiuse field 310. The multiuse field 310 may be further divided into additional fields depending upon the type of channel within which the frame 304 is being transmitted. For instance, frames 304 transmitted within a traffic channel are divided into a sync field 308, a loop signal channel field 312 and a traffic channel field 314. Alternatively, frames transmitted within the broadcast control channel include a sync field 308 and a broadcast signaling channeling field 316. The traffic channel field 314 contains voice or data encoded by the encoder 38 as illustrated in FIG. 2. The sync and loop fields 308 and 312 contain synchronization and signaling information as explained below.

The sync field 308 containing known QPSK code symbols enabling acquisition and tracking of frequency and chip timing by the terminal. It also identifies the frame boundary. Once a terminal acquires the sync field, it is able to acquire the following channel. The broadcast signaling channel field identifies the frame number of the current frame within the hyperframe, which is used for the cipher algorithm. For scripting events, the four LSBs of the frame number unambiguously tell the terminal the frame number in which an event will occur. The masterframe 302 repeats once each 12 frames and begins on frames whose frame number in the hyperframe is evenly divisible by 12, where frames are numbered from 0 to 2,715,647. For example, masterframe number 1 (where masterframes are numbered from 0 to 226,303) begins at frame number 12 and consists of frames number 12 through 23 in the hyperframe. The masterframe is used as the reference point for return access channel (RAC) transmissions and also to resolve ambiguity in the loop signaling information.

The usage of the multiuse field 310 differs depending on whether the CDMA channel is used for broadcast signaling or if it is used as a traffic channel. For traffic channels, the first 12 QPSK symbols of the multiuse field 310 are dedicated to the loop signaling channel field 312. The last 84 QPSK symbols forming the traffic field 314 are then devoted to either traffic or the associated signaling channel when the channel is active. During the inactive state, no voice or data is transmitted in the traffic field 314, but the loop channel continues to transmit the initial 12 QPSK symbols of the loop field 312 after the sync field 308. For broadcast signaling, the entire multiuse field 310 is used for the broadcast signaling channel when the channel is active. As with traffic, the broadcast signaling channels often are inactive.

Figure 14:
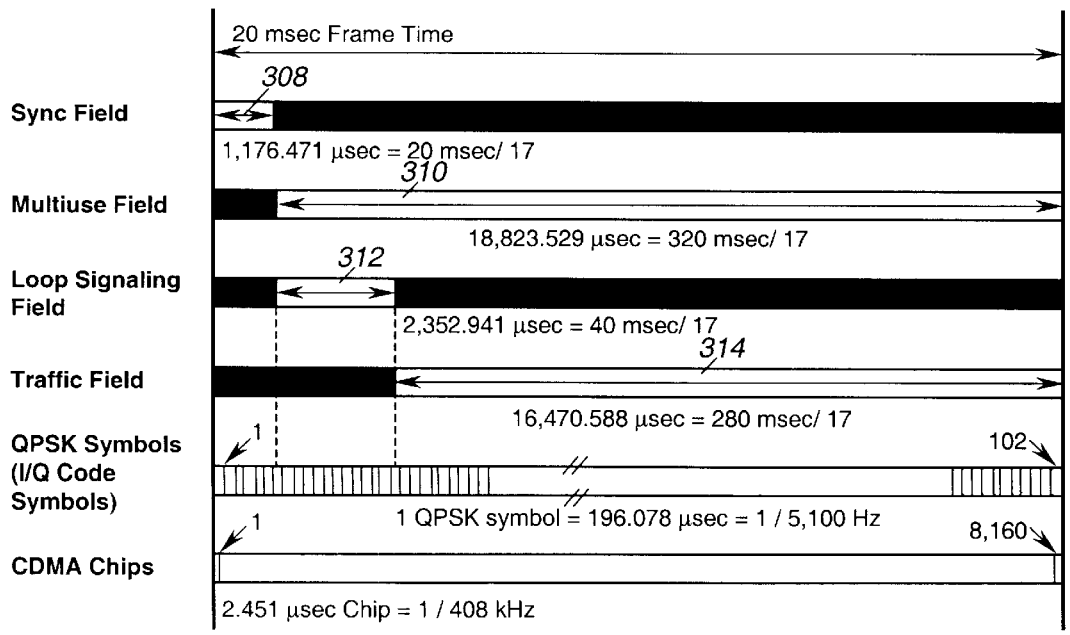
FIG. 14 illustrates the timing relationship among different fields which may comprise a frame.

FIG. 14 illustrates a timing relationship between the fields 308, 310, 312 and 314 which may comprise a frame 306. By way of example only, the sync field may be 1,176.471 usec in length, while the multiuse field 310 is 18,823.528 usec in length. For traffic channels, the loop signaling field 312 may be 2,352.941 usec in length, while the traffic field 314 may be 16,470.588 usec in length. Each QPSK symbol may be 196.078 usec in length, while each CDMA chip may be 2.451 usec in length. It is to be understood that the time period set forth in FIG. 14 are examples only and may vary.

The sync field 308 includes a 480 chip code at the start of each data frame. The same chip code pattern is BPSK modulated into each data frame of every channel in the forward link. The sync field 308 appears in one active subband per feeder channel. The sync field is followed by 96 QPSK symbols of signaling or traffic information as illustrated in FIG. 13. The sync field 308 is the only portion of the data frame that is not covered by the PN isolation code.

The sync field 308 appears in one active subband per feeder channel. The sync field chip code is synchronous with the traffic channel chips. The subband containing the sync field 308 will be frequency-synchronous with the traffic channel subband, but not phase-locked. For the feeder channel within the beam which contains the control channel for that beam, the sync field 308 may be located in the same subband as the broadcast control channel. The sync field in this case is a type 1 sync field. For feeder channels which do not contain the control channel, a type 2 sync field may be used. This prevents a terminal from attempting to read a nonexistent control channel during initial acquisition.

The sync field code may be a Kronecker product of two Neuman-Hoffman codes of lengths 20 (high rate code) and 24 (low rate code). The high rate code (408 kHz) operates a twenty times the low rate code (20.4 kHz) such that in the duration of one chip of the low rate code there is a full period of the high rate code. The Kronecker product structure, which mod-2 adds the two component codes, may be desirable since it permits rapid acquisition of the sync field in the presence of a large frequency uncertainty.

The high rate Neuman-Hoffman code may be 00000 10011 01010 01110 and the low rate Neuman-Hoffman code may be 000001 110011 101010 110110 for type 1 sync fields and 000111 111001 000011 000101 for type 2 sync fields. The sync field 308 power typically may be approximately 10 dB larger than the power of an active portable traffic channel. At beam edges, the power level may be approximately 6 dB larger than the power of an active portable traffic channel.

The associated signaling channel shares a physical channel with the sync field and loop signaling field. It occupies the traffic field portion of the multiuse field, as illustrated in FIGS. 13 and 14. The loop signaling occupies the initial portion of the multiuse field and remains active throughout all calls regardless of whether the traffic field is active or inactive. The earth station transmits loop signals once every 120 msec, or twice per 240 msec master frame. The earth station distributes the loop signal over six consecutive frames. Within the loop signal field 312 of these six consecutive frames, the earth station inserts timing information into the first and second frames, carrier frequency information into the third and fourth frames and power loop information into the fifth and sixth frames.

As illustrated in FIG. 13, the loop signal field 312 within each of the six consecutive frames has a length of 12 QPSK symbols (e.g., six QPSK signal per bit). During transmission of traffic channels 309, the earth station transmits two sets of loop signaling information per master frame since each master frame 302 includes 12 frames. Thus, a first set of loop signaling information is transmitted in the loop signal channel field 312 of the first six frames, while a second set of loop signaling information is transmitted during the loop signal channel fields 312 of the last six frames in the master frame 302.

Figure 16:
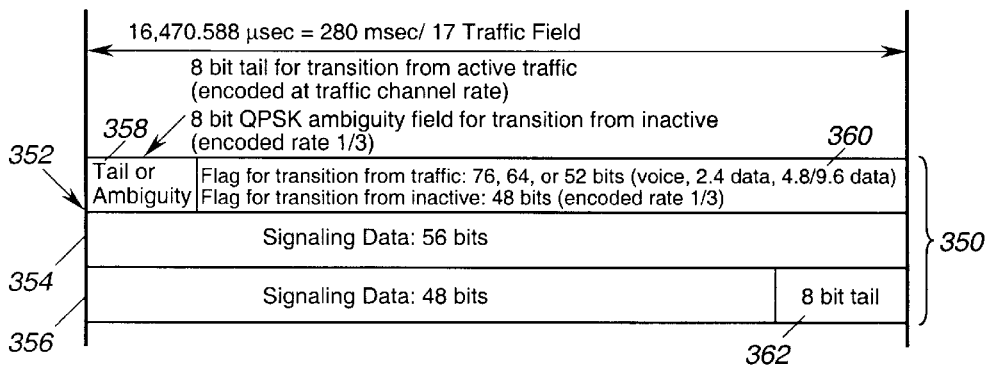
FIG. 16 illustrates an associated signaling channel frame format.

FIG. 16 illustrates the format of an associated signaling channel 350 which relates to a traffic channel 309. The signaling channel 350 comprises a transition frame 352, and two data frames 354 and 356. The frames 352–356 are transmitted sequentially within the signaling channel 350 during setup re-registration and termination of a desired traffic channel between the earth station and terminal. The transition frame 352 signals the start of the signaling channel 350 and indicates that two signaling frames 354 and 356 containing signaling data will follow.

The information bits contained within the signaling frames 352–356 need not necessarily be ciphered, but are encoded by encoder module 38 (FIG. 2) to produce resulting signaling channel code symbols. The signaling channel code symbols are transmitted within signaling frames 352–356 according to the forward link frame structure set forth in FIG. 13. The signaling data may include estimated and corrected frequency and timing offsets necessary for establishing a communications link between the earth station and a terminal.

As illustrated in FIG. 16, the first signaling frame 352 may begin with a tail section 358 for transition from a preceding active traffic frame to the transition frame 352. The tail 358 is followed by a flag field 360 which is also used for transition from traffic channels. The tail field 358 and flag field 360 are used for transitions from active and inactive traffic channels. The second signaling frame 354 includes signaling information which may include 56 bits of data. The third signaling frame 356 includes signaling information which may include 48 bits of signaling data followed by an 8 bit tail segment 362. The tail segment 362 indicates the end of the signaling channel 350. The bits within the tail segment 362 may be used to reemerge the Viterbi Decoder Trellis. At the end of the three frames of the signaling channel 350, the traffic channel reverts to its previous status (e.g., active or inactive) unless the signaling frames indicate termination of a call.

The transition frame 352 format differs depending on whether it is a transition from an inactive traffic channel status or a transition from an active traffic channel status. For transition from an inactive traffic channel status, the transition frame 358 is encoded by a rate 1/3 encoder, with the initial eight information bits converted to 24 code symbols that are used to resolve QPSK ambiguity. The 24 code symbols (12 in-phase, 12 quadrature-phase) of the QPSK ambiguity pattern are common to the transition from inactive to active for all forward link channels. The starting state of the convolutional encoder at the beginning of the transition frame is all the zeroes state. Following the QPSK ambiguity field is a 48-bit pattern used to identify the transition from inactive status to associated signaling status.

For transition from an active traffic channel status, the transition frame 358 is encoded using the traffic channel convolutional code, which depends upon the type of traffic channel 309. For instance, when the traffic channel 309 conveys voice data, the convolutional code resembles that illustrated in FIG. 7, namely a forward rate 1/2 encoder. Similarly, when a traffic field contains data transmitted at 2.4 kbps, the convolutional code resembles that in FIG. 8, namely a rate 1/3 encoder.

Further, when the traffic channel conveys data at 4.8 or 9.6 kbps, the encoder resembles that of FIG. 9, namely a rate 3/7 encoder. This approach allows the transition frame 358 to be a valid convolutionally coded sequence. The transition frame 358 for an active traffic channel consists of the 168 code symbols generated from the information bit sequences in Table 12. The starting state of the convolutional encoder is the ending state of the preceding frame. The transmitted code symbols generated from the initial eight zeroes are not used in the transition detection algorithm, since they depend on the convolutional code state at the end of the preceding frame.

All transition frame 358 patterns may be chosen from a portion of a PN sequence, such as one generated by the polynomial $X^8+X^6+X^5+X^3+1$. The portion chosen may be selected to produce nearly balanced 0s and 1s for code symbols on the in-phase and quadrature modulation channels. In addition, the code symbols for transition from a traffic channel to an associated signaling channel and change of state (active to inactive or vice versa) may match no more than 50% of the generated code symbols.

The terminal switches from a traffic channel to an associated signaling channel when the terminal receives a frame containing code symbols that fall within a predetermined degree of match to the stored reference code symbols for the transition frame. The degree of match for transition to associated signaling from inactive is the same as described below for transition to active traffic from inactive. The degree of match for transition to associated signaling from active traffic is the same as described below for transition to inactive traffic from active.

TABLE 12

Transition from Inactive
(56 bits, encoded rate 1/3)

00100000, 00100000, 10110001, 11000000, 11011110,
10000000, 10010100

Transition from Active Vocoded Voice
(84 bits, encoded rate 1/2)

00000000, 01111110, 11000001, 11110111, 01111110,
10100101, 10101011, 00111001, 00110010

Transition from Active 4.8 or 9.6 kbps Data
(60 bits, encoded rate 5/14)

00000000, 11010010, 01000001, 01100011, 01111110,
10100101, 10101011, 00111001, 00110010

Transition from Active 4.8 or 9.6 kbps Data
(60 bits, encoded rate 5/14)

00000000, 11010010, 01000001, 10000001,
10111101, 00000001, 0010

A traffic channel carrying voice shares a physical channel with the sync field, as shown in FIGS. 13 and 14. The loop signaling occupies the initial portion of the multiuse field and remains active throughout a call regardless of whether the traffic is active or inactive.

A traffic channel carrying voice may include a continuing sequence of 20 msec frames which carry 84 information bits of vocoded data. The vocoded voice is encoded and the resulting code symbols are transmitted. The initial frame in the sequence is a transition frame signaling the start of active vocoded data sequence. The final frame in the sequence is a different type of transition frame indicating the start of an inactive channel status. While the channel is in the inactive status, only the sync field and loop signaling field remain active. The sequence of active frames may be interrupted by the associated signaling channel.

The vocoder transition frames may include 168 code symbols generated from the information bit sequences in Table 13. For the transition to active, the code symbols in the transition frame are broken into 24 MSBs and 144 LSBs. The 24 MSBs are used to resolve QPSK ambiguity and are common to all types of channels. Because of this, the transition frame is rate-1/3 encoded. The starting state of the convolution encoder is zero both for encoding the transition frame again when encoding the start of the following traffic frame at rate 1/2. The encoder is again set to a zero starting state at the beginning of the following traffic frame. For the transition to inactive, the starting state of the convolutional encoder is the ending state of the previous traffic frame.

The terminal performs a transition to the active state if the 168 demodulated code symbols come within 40 code symbols of matching the code symbols in the transition frame. The initial portion of the frame is used to perform the QPSK ambiguity resolution prior to making this decision. The terminal performs a transition to the inactive state if the 152 least significant demodulated code symbols come within 37 code symbols of matching the corresponding code symbols in the transition frame.

TABLE 13

Transition to Active Vocoded Voice
(56 bits, encoded rate 1/3)

00100000, 10110001, 11000000, 11011110, 10000000,
10010100, 11111111

Transition to Inactive Vocoded Voice
(84 bits, encoded rate 1/2)

00000000, 10100101, 10101011, 00111001, 00110010,
00101110, 00100011, 11001011, 11000010, 10001101,
0111

A 2.4 kbps data channel shares a physical channel with the sync field 308 and loop signaling field 312. The 2.4 kbps data channel is transmitted in the traffic field portion of the multiuse field. The loop signaling field occupies the initial portion of the multiuse field and remains active throughout the call for a call regardless of whether the traffic is active or inactive.

When the data channel is active, a 2.4 kbps data stream is transmitted as a continuous sequence of 20 msec frames, each of which carries 72 information bits of user data and protocol. The information bits are encoded and the resulting code symbols transmitted. The initial frame in the sequence is a transition frame signaling the start of active data. The final frame in the sequence is a different type of transition frame indicating the start of inactive channel status. During the inactive status, only the sync field and loop signaling field remain active. The sequence of active frames may be interrupted. If the date is interrupted, it is buffered and transmitted with a three frame delay until the data source becomes inactive, at which time the buffer is flushed.

The 2.4 data channel transition frames consist of the 168 code symbols generated from the information bit sequences in Table 14. For the transition to active, the code symbols in the transition frame are broken into 24 MSBs and 144 LSBs. The 24 MSBs are used to resolve QPSK ambiguity and are common to all types of channels. Because of this, the transition frame is rate-1/3 encoded. The starting state of the convolutional encoder is zero both for encoding the transition frame again when encoding the start of the following traffic frame at rate 3/7. The encoder is again set to zero starting state at the beginning of the following traffic frame. For the transition to inactive, the starting state of the convolutional encoder is the ending state of the previous traffic frame.

The terminal switches to an active state if the 168 demodulated code symbols come within 39 code symbols of matching the code symbols in the transition frame. The terminal analyzes the initial portion of the frame to perform the QPSK ambiguity resolution prior to determining whether an incoming frame represents a transition frame. The terminal performs the transition to an inactive state if the 149 least significant demodulated code symbols come within 35 code symbols of matching the corresponding code symbols in the transition frame.

TABLE 14

Transition to Active 2.4 kbps Data
(56 bits, encoded rate 1/3)

| 00100000, | 10110001, | 11000000, | 11011110, | 10000000, |
| 10010100, | 11111111 | | | |

Transition to Inactive 2.4 kbps Data
(72 bits, encoded rate 8/7)

| 00000000, | 11000001, | 11110111, | 01111110, | 10100101, |
| 10101011, | 00111001, | 00110010, | 00101110 | |

Each of the CDEA channels for transmitting data at 4.8 or 9.6 kbps, respectively, shares a physical channel with the sync field and loop signaling field. The data occupies the traffic field portion of the multiuse field. For each CDMA channel, the loop signaling field occupies the initial portion of the multiuse field and remains active throughout the call regardless of whether the traffic is active or inactive.

When active, each CDMA channel of a 4.8/9.6 kbps data channel transmits a continuous sequence of 20 msec frames which carry 60 information bits of user data and protocol. The information bits are encoded and the resulting code symbols transmitted. The initial frame in the sequence is a transition frame signaling the start of active channel status. The final frame in the sequence is a different type of transition frame indicating the start of inactive channel status. During the inactive status, only the sync field and loop signaling field remain active. The sequence of active frames may be interrupted by the associated signaling channel. If the data is interrupted, it is buffered and transmitted with a three frame delay until the data source becomes inactive, at which time the buffer is flushed.

The 4.8/9.6 kbps data channel transition frames consist of the 168 code symbols generated from the information bit sequences in Table 15. For the transition to active, the code symbols in the transition frame are broken into 24 MSBs and 144 LSBs. The 24 MSBs are used to resolve QPSK ambiguity and are common to all types of channels. Because of this, the transition frame is rate-1/3 encoded. The starting state of the convolutional encoder is zero both when encoding the transition frame again when encoding the start of the following traffic frame and at rate 5/14. The encoder is again set to the zero starting state at the beginning of the following traffic frame. For the transition to inactive, the starting state of the convolutional encoder is the ending state of the previous traffic frame.

The terminal preforms a transition to an active state if the 168 demodulated code symbols come within 41 code symbols of matching the code symbols in the transition frame. The terminal uses the initial portion of the frame to perform the QPSK ambiguity resolution prior to determining whether an incoming frame corresponds to a transition frame. The terminal performs a transition to an inactive state if the 145 least significant demodulated code symbols come within 37 code symbols of matching the corresponding code symbols in the transition frame.

TABLE 15

Transition to Active 4.8/9.6 kbps Data
(56 bits, encoded rate 1/3)

| 00100000, | 10110001, | 11000000, | 11011110, | 10000000, |
| 10010100, | 11111111 | | | |

Transition to Inactive 4.8/9.6 kbps Data
(60 bits, encoded rate 5/14)

| 00000000, | 01000001, | 01100011, | 10000001, | 10111101, |
| 00000001, | 00101001, | 1111 | | |

The broadcast signaling channel (BSC) uses the entire multiuse field of a frame (see FIG. 13) to transmit encoded signaling data since there is no need to provide loop signaling on a broadcast channel.

Two types of signaling channels are categorized as broadcast signaling channels: the Broadcast Control Channel and the Forward Signaling Channel. A broadcast signaling channel shares a physical channel with the sync field, and occupies the entire multiuse field. Loop signaling is not required for broadcast signaling channels. Broadcast signaling channel data is encoded and the resulting code symbols transmitted.

Figure 17:
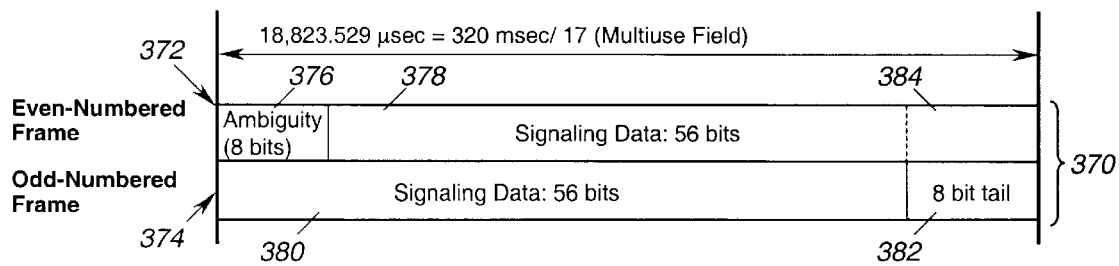
FIG. 17 illustrates a broadcast signaling channel frame format.

FIG. 17 illustrates a broadcast signaling channel and forward signaling channel format having a 40 msec layer-2 frame 360 including two 20 msec physical layer frames 372 and 374. The layer-2 frame 360 begins with the same QPSK ambiguity reference field 376 used above for transition from inactive status. The layer-2 frame 370 concludes with tail bits 382 to reemerge the Viterbi decoder trellis. A 40 msec broadcast signaling channel layer-w frame 370 contains 128 information bits, including 8 bits each for QPSK ambiguity and tail.

The usage of the remaining 112 information bits per 40 msec layer-2 frame 370 depends on the type of signaling information. For paging slots of the FSC, an 8-bit tail 384 is included at the end of even-numbered frames, allowing only the first of two frames to be transmitted when only one page is required for the slot. For other applications (BCC and channel allocation slots of the FSC), the tail 384 is not transmitted on even-numbered frames. No transition frames are used for broadcast signaling since error detection bits plus redundancy inherent in the data is sufficient to distinguish between valid messages and noise.

Figure 18:
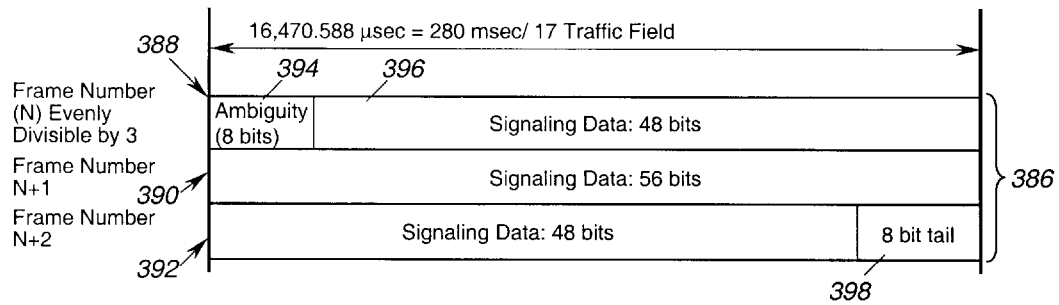
FIG. 18 illustrates a call establishment channel frame format.

FIG. 18 illustrates the format of the Call Establishment Channel which shares a physical channel with the sync field and loop signaling field, and occupies the traffic field portion 314 of the multiuse field 310 (FIG. 11). The loop signaling occupies the initial portion of the multiuse field and remains active throughout the call for a call regardless of whether the Call Establishment Channel is active or inactive.

The Call Establishment Channel has a 60 msec layer-2 frame that includes three 20 msec physical layer frames 388–392. The layer-2 frame 386 begins with the same QPSK ambiguity reference field 394 used for transition from inactive status. The layer-2 frame 386 concludes with tail bits 398 to reemerge the Viterbi decoder trellis.

Unlike a traffic channel, transition frames are not used since there is no need to distinguish between associated signaling and traffic until the call setup is complete. Active versus inactive states are determined by use of 24 error detection bits in the message. A 60 msec broadcast signaling channel layer-2 frame contains 168 information bits, including eight bits 394 for QPSK ambiguity and eight bits for tail 398, and 24 bits for error detection. The remaining usage of the remaining 128 information bits per 60 msec layer-2 frame include one octet each of control and length information and 14 octet message field size.

The chip and symbol timing is aligned on the forward terminal link. Because of time delay differences as a function of path through the satellite, this requires compensating for these delay differences in the earth station, causing chip transitions on the feeder link to be setable for each feeder channel to compensate for delay differences through the satellite. The timing of all of subbands within a feeder channel is such that all the sync fields and ODS-CDMA chips are aligned. The frame alignments between feeder channels are setable in one QPSK symbol increments to produce staggered locations for the sync field. The terminal link chip and symbol alignment are maintained regardless of the stagger.

13.0 Return Link Waveform

Next, the discussion turns to the return link waveform format utilized in connection with transmissions along the return terminal link 26 and return feeder length 28 (FIG. 1).

Figure 19:
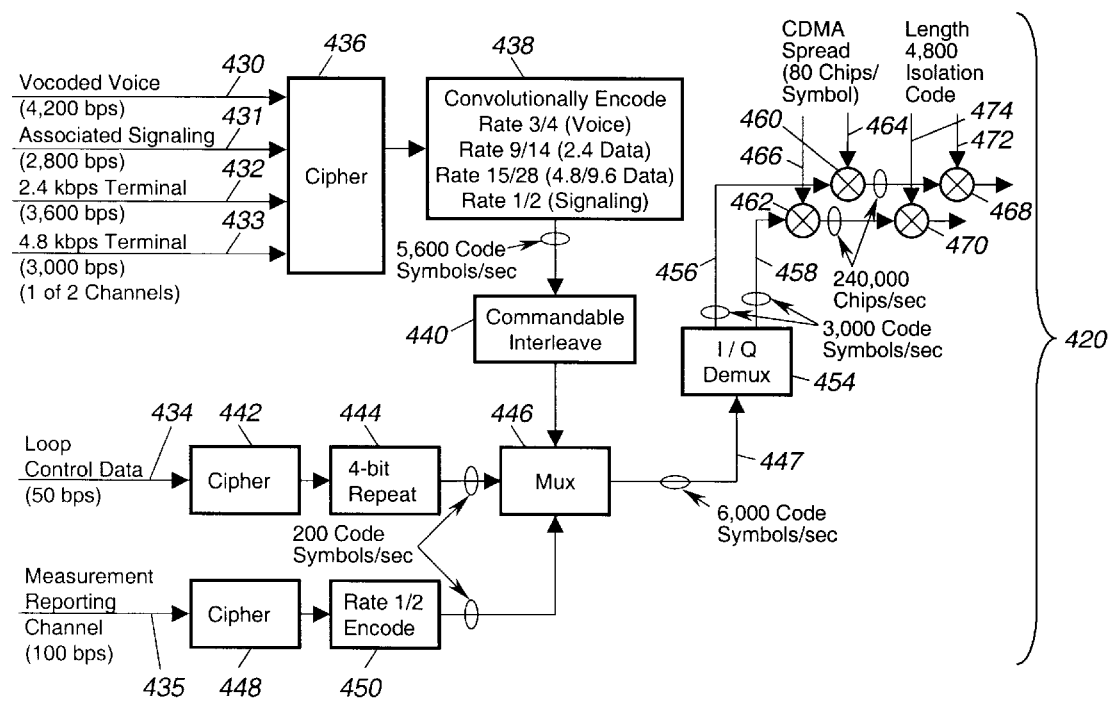
FIG. 19 illustrates a block diagram of a modem assembly of a terminal.

FIG. 19 illustrates a return terminal link waveform generator within a terminal 16 (fixed or mobile) for generating the return terminal link waveform format. The terminal link waveform generator 420 includes input lines 430–435 for receiving vocoded voice data (line 430), associated signaling data (line 431), user data at varying bit rates (lines 432 and 433), loop control data (line 434), and measurement reporting data (line 435). The voice, signaling and user data transmitted along lines 430–433 are supplied to a cipher module 436. The cipher module 436 may cipher one or more of the incoming data signals to ensure user privacy. The ciphering function used within the cipher module 436 may be any one of several conventional ciphering functions. The cipher module 436 outputs ciphered signals to a convolution encoder module 438 which performs differing convolutional encoding functions on the incoming signal based on the type of received data. The convolution encoders used within the convolution encoding module 438 are illustrated in more detail in FIGS. 24 and 25.

By way of example, when voice data is received on line 430 and ciphered in module 436, the convolution encoder module 438 performs a rate 3/4 encoding function on the voice data to generate a rate 3/4 code output. When the cipher module 436 outputs a signal received from input line 431, the encoder module 438 utilizes a rate 1/2 encoder. When the encoder module 438 receives data from input line 432, the encoder module utilizes a rate 9/14 convolution code. When the encoder module 438 receives data from input line 433, it utilizes a rate 15/28 convolution code. It is understood that the above described convolution encoding rates are exemplary and the present invention is not limited to these particular codes.

Upon completion of an encoding function, the module 438 outputs a stream of code symbols corresponding to the stream of information bits received from cipher module 436. The stream of code symbols is delivered to a command interleave module 440 which performs an interleaving function as described below in more detail in connection with FIG. 27. The output of the interleave module 440 is supplied to a mutliplexor 446.

Turning to inputs 434 and 435, loop control data and measurement reporting data are applied to cipher modules 442 and 448, respectively. The cipher modules 442 and 448 may perform ciphering upon the input signals based on conventional ciphering functions to enhance the security of the system. The output of the cipher module 442 is applied to a 4-bit repeater module 444 which converts the ciphered input to a stream of code symbols. The output of cipher module 448 is applied to a rate 1/2 encoder module 450 which converts the stream of incoming information bits to a stream of output code symbols encoded based on a rate 1/2 encoder function. The code symbols from repeater 444 and encoder 450 are applied to the multiplexor 446 and combined to produce a multiplexed code symbol stream transmitted along line 447 to a demultiplexor 454. The demultiplexor 454 separates the incoming code symbol stream into in-phase and quadrature-phase channels by outputting alternating code symbols to each of channels 456 and 458.

Figure 30:
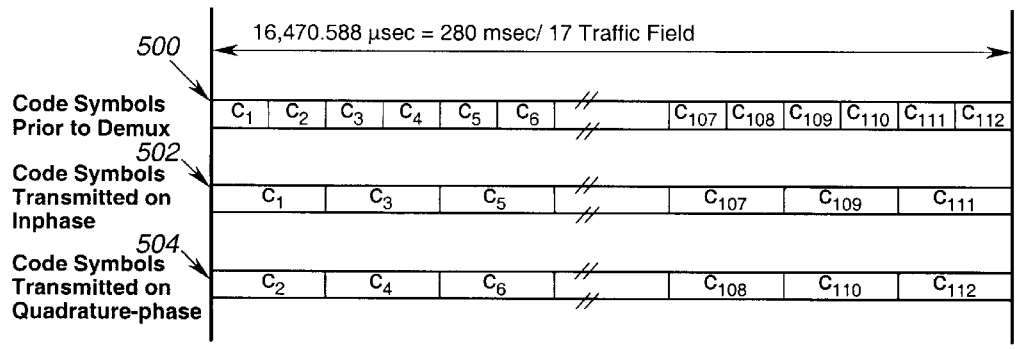
FIG. 30 illustrates the demultiplexed channel structure for code signals generated by the demultiplexor in FIG. 19.

FIG. 30 illustrates the multiplexed stream of code symbols 500 which is transmitted along line 447 to the demultiplexor 454. By way of example only, the stream of code symbols 500 is illustrated to include 112 code symbols which collectively form a 280 msec segment of data which corresponds to 17 traffic fields to be transmitted. The demultiplexor 454 alternately outputs the code symbols upon opposite output channels 456 and 458 to produce an in-phase code symbol stream 502 (which corresponds to the oddly numbered code symbols) and a quadrature-phase code symbol stream 504 (which are evenly numbered). The in-phase code symbol stream is output on channel 456 and the quadrature-phase code stream is output on channel 458. The in-phase and quadrature-phase code streams are applied to modulators 460 and 462 to be combined with a CDMA chip code supplied upon lines 464 and 466, respectively. The outputs of modulators 460 and 462 are applied to a second pair of modulators 468 and 470 for combination with isolation codes introduced upon lines 472 and 474, respectively. The outputs of modulators 468 and 470 are applied to a channel processor illustrated in FIG. 27.

Figure 27:
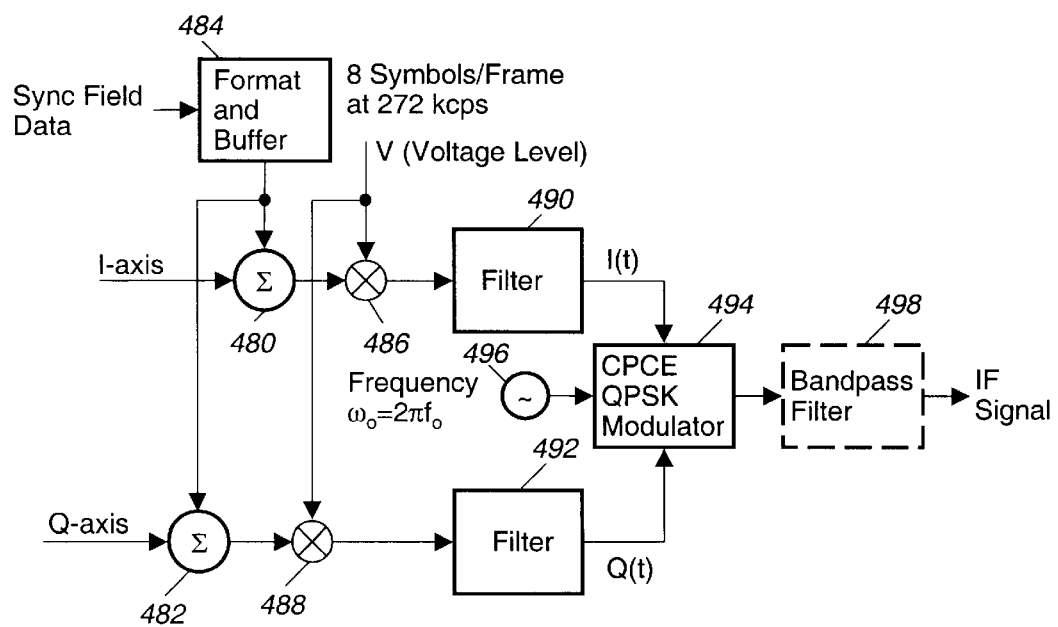
FIG. 27 illustrates a block diagram of a sync field adder and CPCE-QPSK modulation module in a terminal for one channel of the return link.

Turning to FIG. 27, the in-phase and quadrature-phase outputs of modulators 468 and 470 (FIG. 19) are supplied to summers 480 and 482, respectively. A format buffer 484 supplies sync field data to summers 480 and 482 to be combined with the frames being supplied on the in-phase and quadrature-phase channels. The outputs of summers 480 and 482 are applied to modulators 486 and 488 which are modulated based on a reference voltage. The modulator outputs are applied to filters 490 and 492 for digital filtering. The output of the filters 490 and 492 are applied to a constant phase constant envelope quadrature-phase shift keying modulator 494 (CPCE-QPSK). The modulator 494 combines the input signals with the output of oscillator 496. The output of the modulator 494 is supplied to a bandpass filter 498 which produces an intermediate frequency signal within the filter's passband. The intermediate frequency signal may later be modulated with a high frequency oscillator signal to convert the intermediate frequency signal to a frequency as illustrated in FIGS. 20–23.

Next, the return link waveform format is described in more detail.

Figure 22:
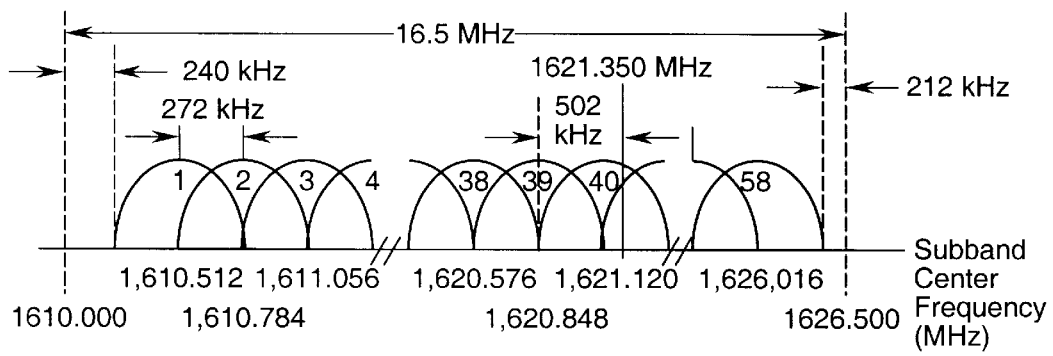
FIG. 22 illustrates a terminal return link spectrum at the satellite.

The return link uses orthogonal direct-sequence, code division multiple access (ODS-CDMN) to minimize multiple access self-interference. As shown in FIG. 22, the received return terminal link has a 16.5 MHz passband extending from 1610 MHz to 1626.5 MHz. This spectrum may be divided into 58 subbands with 272 kHz center-to-center spading. Table 16 lists the transmitted center frequency for these subbands. Guard bands of 240 kHz and 212 kHz may be located at the bottom and top, respectively, of the 16.5 MHz allocation. Each subband may include 80 ODS-CDMA channels.

TABLE 16

| Subband | Center Frequency (MHz) |
|---|---|
| 1 | 1610.512 |
| N | 1610.240 + 0.272 × N |
| 58 | 1626.016 |

Optionally, the passband may only be partially used, depending upon the presence of GLONASS and other spectrum sharing agreements. In the United States, for example, the frequency range from 1610 to 1621.35 has been allocated to Odyssey and Global Star, with 1621.35 to 1626.5 allocated to Iridium, the systems referenced above. The system of the preferred embodiment may use high rate convolutional coding and narrow subband spacing to support the forward link waveform capacity (as described above) using 38 of these 58 subbands.

Doppler effects due to satellite 12 motion cause the frequency transmitted by a terminal 16 to differ from the frequency received by the satellite 12. The terminal 16 and earth station 14 transmit, over the signaling channels, frequency and timing loop correction information in order to enable the terminal 16 to correct its transmission frequency and timing, thereby correcting for Doppler effects. For a range rate of v between the satellite 12 and terminal 15, each of the center frequencies listed in FIG. 22 and Table 17 are multiplied by 1-(v/c), where c is the speed of the light. The maximum range rate between the terminal 16 and the satellite 12 is $\pm 1 \times 10^{-5}$ times the speed of light. This corresponds of a maximum Doppler shift of approximately ±16 kHz.

Figure 23:
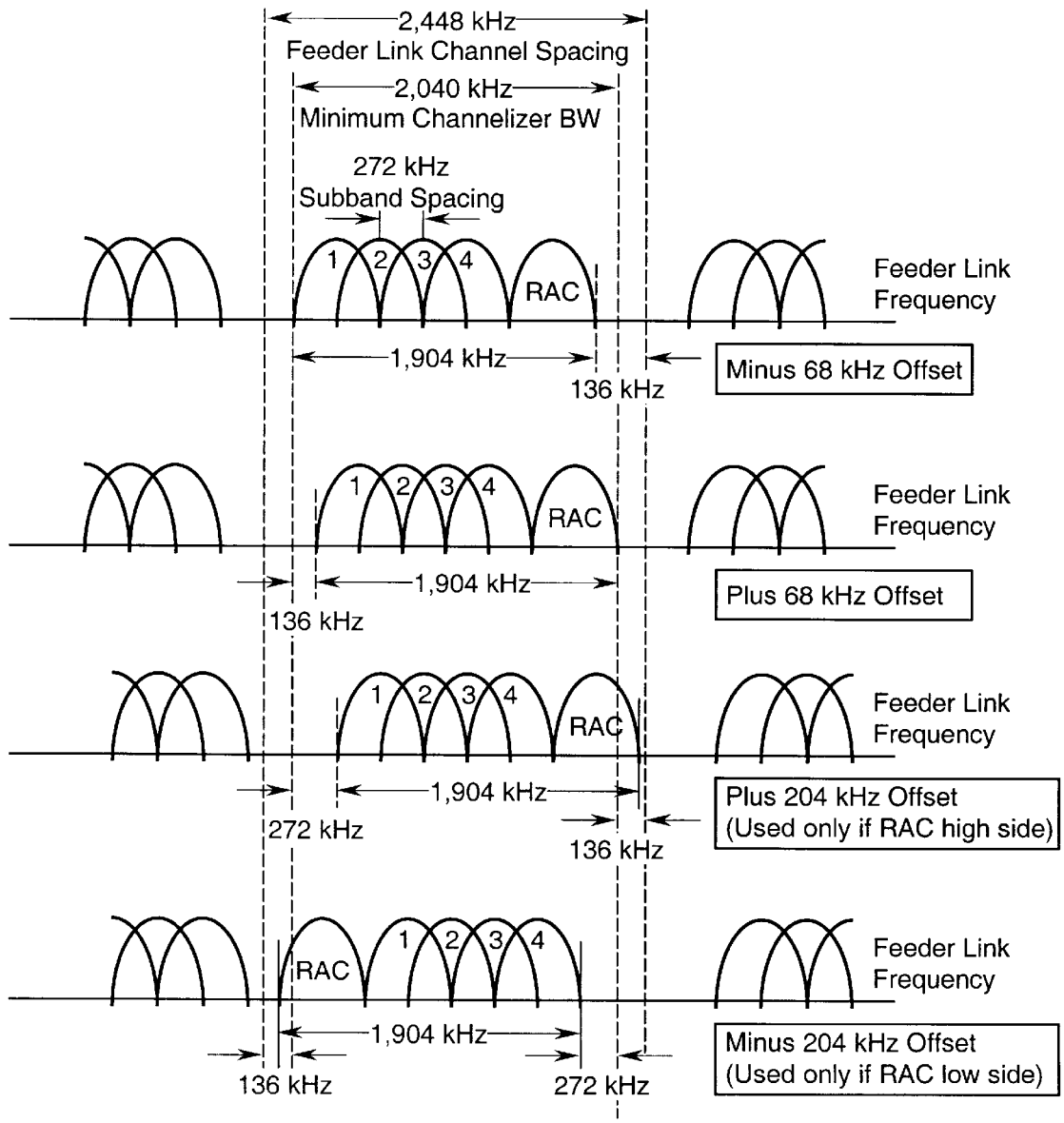
FIG. 23 illustrates the subband distribution within a return feeder link channel.

Each beam may have up to five feeder channels connected thereto. The satellite 12 translates each feeder channel in frequency and routes it to a specific beam. As depicted in FIG. 23, the frequency translation is such that each return feeder channel has sufficient bandwidth to include four contiguous subbands plus a return access channel (RAC), which is explained below. The forward feeder channel is designated to include four subbands to ensure sufficient bandwidth for at least one RAC per four subbands. The RAC(s) for a beam may be located at any subband which falls within the return channelizer of the satellite which is separated from subbands which are active in the beam by at least one subband. In addition, subbands serving as guard bands between satellites may also be used for a RAC.

Because the channelizer performs the translation in 408 kHz steps, the group of four subbands plus RAC will either be centered within the channel or offset either high or low in frequency by +/−68 kHz or +/−204 kHz. In the event that +/−204 kHz offset is required, the offset is chosen so that the RAC is pushed towards the edge of the channel instead of toward the traffic channels. The offset is determined based on the subband numbers placed within a particular feeder channel.

Figure 20:
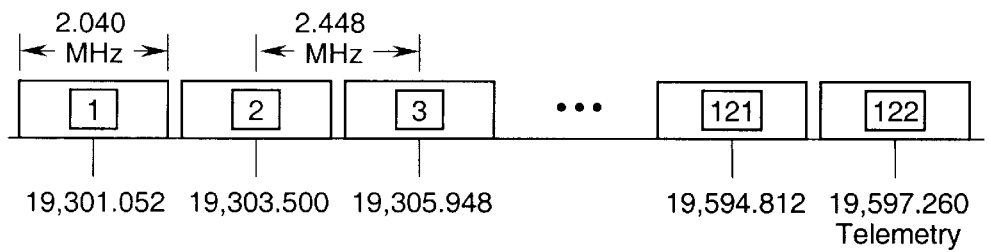
FIG. 20 illustrates the return feeder link spectrum at the satellite.

As shown in FIG. 20, the return feeder link spectrum at the satellite 12 extends from 19,300 to 19,600 MHz. Table 17 sets forth the feeder channel numbering. Feeder channel number 122 is devoted to telemetry. Unlike the forward link, no feeder channels may be replaced by pilot tones. The center frequency and spacing between feeder channels transmitted must be adjusted to compensate for Doppler effects caused by satellite motion to produce this channel center frequency and feeder channel spacing at the satellite in order to maintain synchronization between the earth stations sharing the satellite. For a range rate of v between the satellite and earth station, each of the center frequencies listed in FIG. 20 and Table 17 are multiplied by 1-(v/c), where c is the speed of light. The maximum range rate between the earth station and the satellite is $\pm 2 \times 10^{-5}$ times the speed of light. This corresponds of a maximum Doppler shift of proximately ±400 kHz.

TABLE 17

| Feeder Channel | Center Frequency (MHz) |
|---|---|
| 1 | 19301.052 |
| N | 19298.604 + 2.448 × N |
| 122 | 19597.260 |

Figure 21:
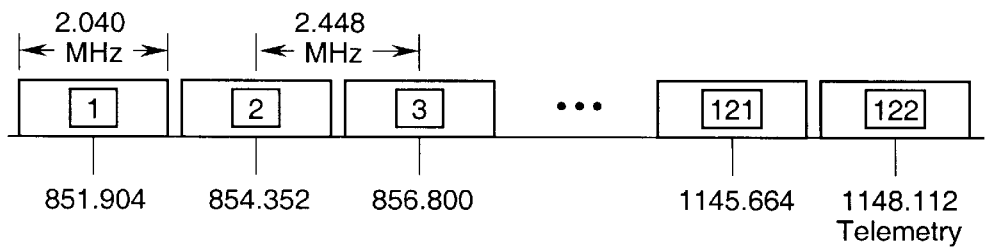
FIG. 21 illustrates the return baseband feeder spectrum.

As shown in FIG. 21, the Return baseband feeder spectrum has a 300 MHz passband nominally extending from 850.884 MHz to 1149.132 MHz. The feeder spectrum may be divided into 122 feeder channels numbered from 1 to 122, and centered as shown in Table 18. The precise frequency and channel spacing is adjusted to compensate for Doppler effects caused by satellite motion. This is necessary to maintain synchronization between earth stations sharing a satellite. Feeder channel number 122 is devoted to the spacecraft telemetry links.

TABLE 18

| Feeder Channel | Center Frequency (MHz) |
|---|---|
| 1 | 851.904 |
| N(1 ≦ N ≦ 122) | 849.456 + 2.448 × N |
| 122 | 1148.112 |

14.0 Channel Types

Next, the types of channels transmitted over the return link are explained in more detail. The channel types includes traffic channels, associated signaling channels, measurement reporting channels, return loop signaling channels, return call establishment channels and return access channels.

A traffic channel (TCH) is a dedicated channel assigned to a given terminal. It can transmit up to 4200 bps of vocoded voice data with a BER<$10^{-3}$, 3600 bps digital data with a BER<$10^{-5}$ (2400 bps subscriber data and 1200 bps V.110 protocol for 2400 bps terminals), or 3000 bps digital data with a BER<$10^{-5}$ (2400 bps subscriber data and 600 bps V.110 protocol per circuit for 4800 and 9600 bps terminals).

The return associated signaling channel (ASC) is used to convey signaling information from the terminal 16 to the earth station 14 necessary for a dedicated traffic channel to be set up. The return associated signaling channel is transmitted between the terminal 16 and the earth station 14 during a time period immediately prior to establishment of a traffic channel. The return associated signaling channel may include three consecutive frames from the traffic channel to be established. The signaling information transmitted within the associated signaling channel may include, by way of example, 112 bits of signaling data sent with a bit error ratio (BER)<$10^{-5}$.

The measurement return channel is used to transmit radio environment data from the terminal 16 to the earth station 14. The environment data includes information concerning signal quality for one or more beams detected at the terminal 16. As explained above, multiple beams from one or more satellites may overlap a single terminal.

The terminal 16 detects signal strength/quality of each of these beams and relays such information to the earth station 14 via the measurement reporting channel. The earth station 14 processes this environment data to determine which of the detected beams should be used to establish a communications link with the terminal 16.

By way of example only, the beam having the highest signal strength/quality may be determined to be the best candidate beam for use with the terminal 16. This process of determining the best candidate beam for use with the terminal 16 may be carried out during a handover process in which a terminal 16 has already established and is maintaining a communications link via a first beam with an earth station. As the first beam passes over the terminal 16, the earth station uses the measurement reporting channel and environment data contained therein to determine the next beam to be used with the terminal 16. Based on this determination, a handover operation is effected, and the terminal 16 is reassigned to the new beam.

The measurement reporting channel may represent a dedicated portion of the traffic channel return link and may be configured to support 100 bps of bandwidth with a bit error ratio (BER)<$10^{-5}$. According to the preferred embodiment, the measurement reporting channel utilizes approximately 640 msec of transmission time to transmit one measurement report of environment data concerning all beams detected by a single terminal.

The return loop signaling channel (LSC) does not represent a channel in the network layer, since it performs its functions solely in the physical layer. The return loop signaling channel reports to the earth station 18 the received signal quality measured on the forward traffic channel. The LSC may be transmitted as needed, for instance, once each 120 msec as a six-bit update to the earth station 14 regarding the signal quality.

The Return Call Establishment Channel (CEC) is used to convey call setup information from the terminal 16 to the earth station 14. At the conclusion of a successful call setup, including the ringing interval, the terminal 16 is assigned to a traffic channel. Unlike the associated signaling channel, there is no need to switch back and forth between the CEC and a traffic channel. This permits devoting five code symbols of the initial frame in a CEC burst to signaling information, instead of devoting the frame entirely to a transition frame. The increased message length per burst (14 octets versus 9 octets for the ASC) allows most call setup messages to be transmitted in a single 3-frame burst.

To increase channel circuit capacity, the CEC may be configured as a channel shared among multiple users. In this case, the return link may be slotted into h-frame slots, with each slot dedicated to one of the h-terminals. Each terminal would be assigned a separate sync field to allow normal code tracking of the users by the earth station. Loop signaling would expand to fill the space occupied by the measurement reporting channel, with the doubled throughput allowing 2/3 of the normal loop signaling throughput to be maintained. Measurement reporting would be performed by transmitting a measurement report message on the return CEC.

When a terminal 16 wishes to place or receive a call, it must be first synchronized in time and frequency with an earth station before being assigned a traffic channel. The initial access is made via the Return Access Channel (RAC). The RAC is transmitted over a nonsynchronous link which utilizes a nonsynchronous spread spectrum PN signal access burst to request a traffic channel from an earth station. The Broadcast Control Channel informs the terminal of which subband to use for the RAC and transmission of the access bursts. This nonsynchronous subband is not occupied by in-beam traffic. The RAC frequency and subband are not active in the beam of interest, but instead typically are a frequency and subband assigned to carry traffic in one or more adjacent beams of the same or of another satellite. This conserves the use of the return link spectrum, while reducing the level of asynchronous CDMA interference between the RAC burst and traffic using the same frequency.

Optionally, the terminal may derive the frequency and subband for use to carry the return access channel based on the broadcast control channel and nominal return access channel frequencies. For instance, the terminal may obtain a received frequency for the broadcast control channel and may obtain nominal frequencies for the return access channel and broadcast control channel. Based on these received and nominal frequencies, the terminal may calculate the frequency upon which to transmit RAC bursts by multiplying the received frequency of the broadcast control channel times the nominal return access channel frequency and dividing this product by the nominal frequency of the broadcast control channel. This derivation allows geolocation of the terminal based on the signal bursts. This derivation also reduces the frequency range over which the earth station return access channel receiver must search for RAC bursts since the earth station may predict the derivation performed by the terminal. In addition, their derivation reduces the accuracy required of the terminal frequency reference.

The frequency and subband used to carry the RAC burst, which may be identified in the broadcast control channel, may be a subband not occupied by in-beam traffic. Instead, the frequency and subband which transmits the RAC burst may be above or below the frequencies and subbands carrying traffic. The frequency used for carrying RAC bursts is not active within the "beam of interest", but instead is typically a frequency assigned to carry traffic in one or more adjacent beams of the same satellite or one or more beams from another satellite. This conserves the use of return link spectrum, while reducing the level of asynchronous CDMA interference between the RAC burst and traffic using the same frequency.

15.0 Waveform Structure and Modes

The overall Return Link waveform is Frequency Division Multiplexed Orthogonal Code Division Multiple Access (OCDMA). Each channel uses one of a set of orthogonal Quadratic Residue codes. Synchronization in time and frequency is accomplished by a sync field in each 20 ms vocoder frame. A set of up to 80 channels may be supported by a subband. The subbands are packed in a FDMA format as received at the earth station. All terminals delay the times at which they transmit their signals so they are received in chip, symbol, bit and frame and synchronism at the earth station.

16.0 Modulation Format

The return link may use the Continuous-Phase Constant-Envelope Quadrature Phase Shift Keyed modulation (hereinafter referred to as CPCE-QPSK) as described below. The choice of CPCE-QPSK provides the desired level of out of band emissions while allowing the use of saturating amplifiers with most post-amplifier filtering. The CPCE-QPSK modulation is defined for a single channel signal (S(t)) at IF or RF as follows:

$$S(t) = (A/\sqrt{2})[I(t)\cos(\omega t + \Theta) + Q(t)\sin(\omega t + \Theta)]$$
$$= A\sqrt{(I^2(t) + Q^2(t))/2}\cos(\omega t + \Phi(t) + \Theta);$$

Where A is the signal amplitude, ω is the subband carrier frequency in radians/sec, t is time, I(t) is the in-phase modulation, Q(t) is the quadrature modulation, Φ (t) is the information-bearing carrier phase defined by Φ (t)= arctan (−Q(t)/I(t))
(defined from −π to +π radians based on signs of Q(t) and I(t)

and Θ is an arbitrary fixed phase. Because CPCE-QPSK is constant-envelope.

$\sqrt{(I^2(t)+Q^2(t))/2}=1$.

There are up to 80 independent channel signals arriving at the earth station 12 in each subband, with each signal having somewhat different power, frequency, phase and timing. The power, frequency and chip timing are controlled via loop signaling to be nearly the same as received by the satellite. However, the received phase is independent from signal to signal. The in-phase and quadrature-phase modulation are generated from the multiplexed encoded voice or data plus signaling.

Each frame of baseband modulating data consists of a sequence of 5,440 in-phase chips and 5,440 quadrature chips. The sequence of in-phase chips are denoted $c_1 \ldots c_{5440}$, where $c_1$ is the first chip in the frame, and $c_{5440}$ is the last chip in the frame. The sequence of quadrature chips are denoted $d_1 \ldots d_{5440}$. For conventional QPSK, the baseband modulation $I_q(t)$ and $Q_q(t)$ for a single frame (where t=0 is the starting time of the frame) are given by:

$$I_q(t) = \sum_{n=1}^{5440} (2C_n - 1)[u(t/T_c - n + 1) - u(t/T_c - n)]$$

$$Q_q(t) = \sum_{n=1}^{5440} (2d_n - 1)[u(t/T_c - n + 1) - u(t/T_c - n)]$$

where u(t)=1 if t≥0; 0 if t<0

$T_c$=chip duration: (1/272)

The expression $(2c_n-1)$ converts the chips from the digital {0,1} values to the {−1,+1} values appropriate for describing the modulation. The corresponding conventional QPSK carrier phase is given by:

$\emptyset_q(t)$= arctan $(-Q_q(t)/I_q(t))$

Because the spreading modulation is effectively BPSK, all chip transitions with conventional QPSK have a 0.5 probability each of being either 0 or 180 degrees in phase within a given code symbol. Chip transitions on code symbol boundaries have a 0.25 probability each of being 0, +90, −90, or 180 degrees.

The first primary difference between conventional QPSK and the CPCE-QPSK of the preferred embodiment is a +90 degree phase shift added to all even-numbered chips. This causes 100% of the chip transitions within a code symbol to be either +90 or −90 degrees. Transitions on code symbol boundaries remain equally likely to be 0, +90, −90 or 180 degrees. This is stated mathematically by introducing the phase Φn defined as follows:

Φ = arctan$[-(2d_n - 1)/(2c_n - 1)]$ for $n$ odd

= arctan$[-(2d_n - 1)/(2c_n - 1)] + \pi/2$ for $n$ even.

Φ is considered to take on values of ±π/4 and ±3π/4, with the quadrant based on the signs of $(2d_n-1)$ and $(2c_{n-1})$. An exception to this occurs for phase transitions which cross the minus y axis (or +/−π phase). When calculating the phase during such transitions, negative values of $\Phi_n$ have 2π added to them.

CPCE-QPSK uses continuous-phase transitions having a sinusoidal phase trajectory. With time sampled in increments of $T_c/32$, the time $t_{n,i}$ relative to the start of the frame is defined by $t_{n,i}=[n-1+((2xi)-1)/64)]T_c$ when n=1, . . . , 5440 and i=1, . . . 32. The information-bearing phase (t) at time $t_{n,i}$ is given by $\Phi(t_{n,i})=a(i)\Phi_{n-1}+b(i)\Phi_n+c(i)\Phi_{n+1}$ The coefficients a(i), b(i), and c(i) are given in Table 19 for Class 1 (typical) and Table 20 for Class 2 (narrowband) modulation. Class 2 modulation is used on a selectable basis for subbands near the upper end of the assigned band to reduce interference with other systems which operate above the assigned band, such as Iridium. The appropriate multiple of 2π is added to $\Phi_{n-2}$, $\Phi_n$, or $\Phi_{n+1}$, if necessary, to ensure the transition does not exceed π radians (i.e., to avoid a π/2 transition from being misinterpreted as a 3π/2 transition in the calculation). For transitions of π radians (which occur only on code symbol boundaries and then only with probability 0.25), the appropriate multiple of 2π is added to $\Phi_{n-2}$, $\Phi_n$, or $\Phi_{n+1}$, if necessary, so that two consecutive counter-clockwise π radian transitions occur. Balancing +π and −π transitions avoids creating discrete line spectra in the transmitted waveform.

The last phase value ($\Phi_{5440}$) in the preceding frame is used as Φ0 when calculating the phase trajectory on the initial transition. If the preceding frame is inactive $\Phi_0$ is equal to $\Phi_1$ of the current frame. Similarly, $\Phi_{5440}$ is $\Phi_0$ of the subsequent frame. Because the sync field is active throughout the call, $\Phi_0$ is always an active phase.

TABLE 19

| Index (i) | a (i) | b (i) | c (i) |
|---|---|---|---|
| 1 | 0.413175911 | 0.586824089 | 0.00000000 |
| 2 | 0.250000000 | 0.750000000 | 0.00000000 |
| 3 | 0.116977778 | 0.883022222 | 0.00000000 |
| 4 | 0.030153690 | 0.969846310 | 0.00000000 |
| 5 to 28 | 0.000000000 | 1.000000000 | 0.00000000 |
| 29 | 0.000000000 | 0.969846310 | 0.030153690 |
| 30 | 0.000000000 | 0.883022222 | 0.116977778 |
| 31 | 0.000000000 | 0.750000000 | 0.250000000 |
| 32 | 0.000000000 | 0.586824089 | 0.413175911 |

TABLE 20

| Index (i) | a (i) | b (i) | c (i) |
|---|---|---|---|
| 1 | 0.439731660 | 0.560268340 | 0.000000000 |
| 2 | 0.322697556 | 0.677302444 | 0.000000000 |
| 3 | 0.215967627 | 0.784032373 | 0.000000000 |
| 4 | 0.125744626 | 0.874255374 | 0.000000000 |

TABLE 20-continued

| Index (i) | a (i) | b (i) | c (i) |
|---|---|---|---|
| 5 | 0.057271987 | 0.942728013 | 0.000000000 |
| 6 | 0.014529091 | 0.985470909 | 0.000000000 |
| 7–26 | 0.000000000 | 1.000000000 | 0.000000000 |
| 27 | 0.000000000 | 0.985470909 | 0.014529091 |
| 28 | 0.000000000 | 0.942728013 | 0.057271987 |
| 29 | 0.000000000 | 0.874255374 | 0.125744626 |
| 30 | 0.000000000 | 0.784032373 | 0.215967627 |
| 31 | 0.000000000 | 0.677302444 | 0.322697556 |
| 32 | 0.000000000 | 0.560268340 | 0.439731660 |

17.0 Power Levels

The terminal transmitted power level shall be controlled by commands from an earth station with which the terminal is communicating to provide selectable differing power margins for each signal (e.g., each channel or field). The power for the multiuse field shall be commandable off during periods of voice/data inactivity.

18.0 Return Link Subscriber Privacy

The return access channel and the sync field are not ciphered. The multiuse portion of traffic channel frames may be siphered with a conventional ciphering function, such as the GSM cipher. The cipher key may be calculated from two pieces of information: (1) the user's authentication key which is known to the system, but not transmitted over the air interface, and (2) a random number transmitted over the forward access channel during the initial traffic channel assignment. This approach prevents recording the response of a particular handset and mimicking its response to a traffic assignment, since the response is a function of the transmitted key.

The cipher may combine the cipher key and the TDMA frame number to create a 114 bit cipher sequence. The frames may be numbered from 0 to 2,715,647. As described above, the forward-link and return-link frames are numbered from 0 to 2,715,647 within a hyperframe. The forward-link frame number within a hyperframe is broadcast over the Broadcast Control Channel. The forward link frame number may be misaligned from the return-link frame by up to ±6.8 msec since a one-way delay of ±3.4 msec difference may exist across a beam. This delay is sufficiently less than half a frame (10 msec) so that the return-link frame numbering will be unambiguous.

The two initial bits of the cipher are used to cipher the two loop signaling information bits. The second and third cipher bits are used to cipher the measurement reporting information bits. The information bits transmitted in the multiuse portion of a frame are then ciphered using as many of the remaining bits of the cipher as are required (84, 72, 60, and 64 bits for voice, 2.4 kbps data, 4.8/9.6 kbps data, and signaling, respectively).

19.0 Return Link Error Correction Coding

Figure 24:
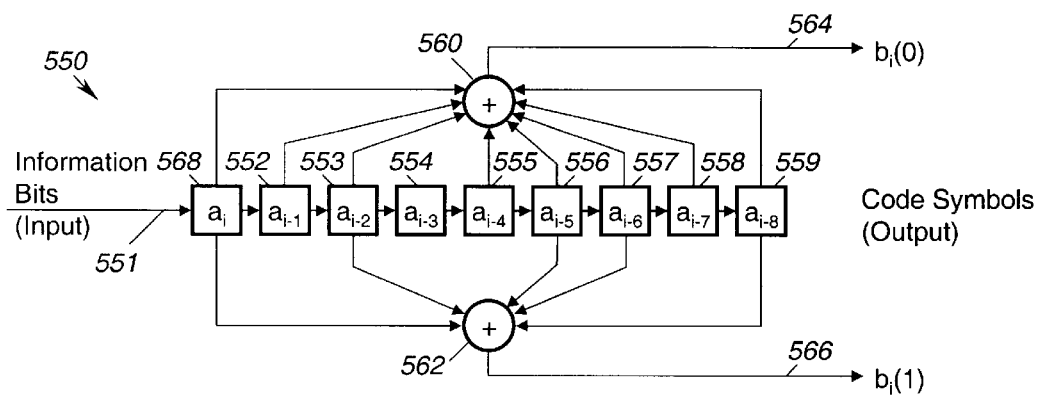
FIG. 24 illustrates a block diagram of an encoder used to generate a rate 1/2 code in the return link.
Figure 25:
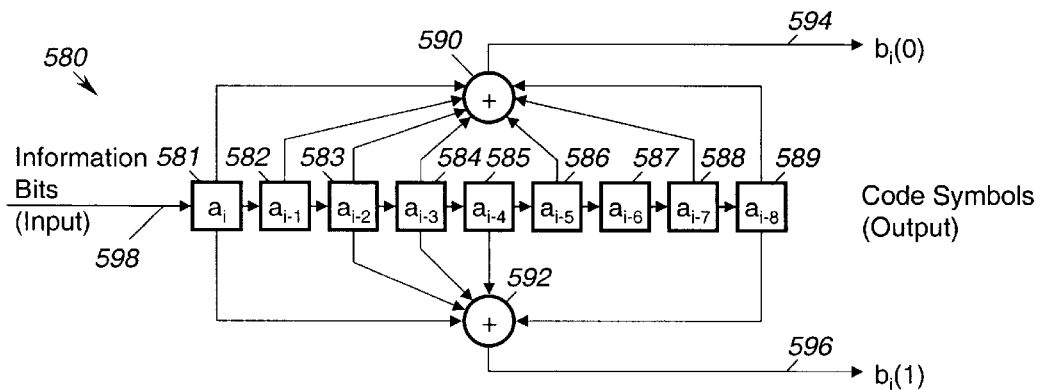
FIG. 25 illustrates a block diagram of an encoder used to generate a rate 1/2 code in the return link.

Next, the description turns to the discussion in the manner in which the preferred embodiment performs return link error correcting coding. FIGS. 24 and 25 illustrate block diagrams of exemplary rate encoders which may be utilized in connection with the return link.

FIG. 24 illustrates a rate 1/2 encoder 550 which includes 9 one-bit shift registers 551–559 which store sequential information bits serially shifted from input line 568 through the registers. The generators 560 and 562 for the rate-1/2 encoder 550 are given by $g_0$=737 (octal) and $g_1$=515 (octal). Generators 560 and 562 tap predefined subsets of the shift registers 551–559 and produce code symbols based thereon which are output on lines 564 and 566. Generator 560 taps registers 551–553 and 555–559. Generator 562 taps registers 551, 553, 556–557 and 559. Two code symbols are produced for each information bit shifted through the registers.

As in the forward link, the voice data may be transmitted at a 4.2 kbps information rate, which corresponds to 84 information bits per 20 msec frame transmitted through the traffic channel.

Information bits are denoted $a_1 \ldots a_{84}$ where $a_1$ is the first information bit received from the vocoder, and $a_{84}$ is the last. The information bits are encoded with a rate-3/4 convolutional code, producing 112 transmitted code symbols per frame. These code symbols are denoted $c_1 \ldots c_{112}$, where $c_1$ is the first code symbol in the frame, and $c_{112}$ is the last.

The rate-3/4 code is produced by puncturing the rate-1/2 constraint length 9 convolutional encoder of FIG. 24. As illustrated in FIG. 24, the rate-1/2 code produces two code symbols, $b_i(0)$ and $b_i(1)$, from the information bits $\{a_i, \ldots, a_{i-8}\}$. Subscripts less than one in $\{a_i, \ldots, a_{i-8}\}$ refer to the last information bits of the preceding frame, with 84 added to the subscript to indicate the information bit location in the preceding frame. In the event that there is no preceding active frame (i.e., the preceding frame is a transition frame or an associated signaling channel frame) then information bits with subscripts less than one are zero. Not all of these code symbols $b_i(k)$ are transmitted, however. The transmitted code symbols $c_i \ldots c_{112}$, are related to the $b_i(k)$ as illustrated Table 21. The terminal omits code symbols $b_1(1)$, $b_2(1)$, $b_4(1)$, $b_5(1)$, $b_7(1)$, $b_8(1)$, etc.

TABLE 21

| Transmitted Code Symbol ($c_i$) Index | Transmitted Code Symbol |
|---|---|
| 1 | $b_1$ (0) |
| 2 | $b_2$ (0) |
| 3 | $b_3$ (0) |
| 4 | $b_3$ (1) |
| ... | ... |
| 111 | $b_{84}$ (0) |
| 112 | $b_{84}$ (1) |

FIG. 25 illustrates an encoder 580 which performs a rate 9/14 convolution code. The encoder 580 includes nine shift registers 581–589 which receive information bits serially from input line 598. Generators 590 and 592 tap subsets of the shift registers 581–589 to produce code symbols upon output lines 594 and 596, respectively, according to the rate 9/14 convolutional code. In particular, generator 590 taps registers 581–584, 586 and 588–589. Generator 592 taps registers 581, 583–585 and 589. The generators 590 and 592 for the rate-1/2 code are given by $g_0$=753 (octal) and $g_1$=561 (octal).

The encoder 580 receives data at 2.4 kbps along with 1.2 kbps of protocol to provide compatibility with the V.110 protocol. The net 3.6 kbps corresponds to 72 information bits per 20 msec frame transmitted over the traffic channel. The information bits are denoted $a_1 \ldots a_{72}$ where $a_1$ is the first information bit received by the encoder, and $a_{72}$ is the last. The information bits are encoded with a rate-9/14 convolutional code, producing 112 transmitted code symbols per frame, the same as for vocoded data. These code symbols are denoted $c_1 \ldots c_{112}$, where $c_1$ is the first code symbol in the frame, and $c_{112}$ is the last.

The rate-9/14 code is produced by puncturing a rate-1/2 constraint length 9 convolutional code as illustrated in FIG. 25. The encoder 580 produces two code symbols, $b_i(0)$ and $b_i(1)$, from the information bits $\{a_1, \ldots, a_{i-8}\}$ and the two code generators 590 and 592. Subscripts less than one in $\{a_i, \ldots, a_{i-8}\}$ refer to the last information bits of the preceding active frame, with 72 added to the subscript to indicate the information bits location in the preceding frame. In the event that there is no preceding frame (i.e., the preceding frame is a transition frame or an associated signaling channel frame) then information bits with subscripts less than one are zero. Not all of these code symbols $b_i(k)$ are transmitted, however. The transmitted code symbols, $c_1 \ldots c_{112}$, are related to the $b_i(k)$ as illustrated in Table 22. As shown in Table 22, puncturing is achieved by omitting code symbols $b_2(0)$, $b_4(0)$, $b_6(0)$, $b_8(0)$, etc.

TABLE 22

| Transmitted Code Symbol ($c_i$) Index | Transmitted Code Symbol | Transmitted Code Symbol ($c_i$ Index | Transmitted Code Symbol |
|---|---|---|---|
| 1 | $b_1$ (0) | 10 | $b_7$ (0) |
| 2 | $b_1$ (1) | 11 | $b_7$ (1) |
| 3 | $b_2$ (1) | 12 | $b_8$ (1) |
| 4 | $b_3$ (0) | 13 | $b_9$ (0) |
| 5 | $b_3$ (1) | 14 | $b_9$ (1) |
| 6 | $b_4$ (1) | ... | ... |
| 7 | $b_5$ (0) | 111 | $b_{72}$ (0) |
| 8 | $b_5$ (1) | 112 | $b_{72}$ (1) |
| 9 | $b_6$ (1) | | |

Optionally, the terminal may transmit data at 4.8 kbps along with 1.2 kbps of protocol to provide compatibility with the V.110 protocol. The net 6.0 kbps of data may be transmitted over two CDMA channels operating at 3.0 kbps of information. The 12.0 kbps of information may be divided into four separate CDMA channels producing the same 3.0 kbps information rate per CDMA channel as 4.8 kbps data users. The 3.0 kbps of each CDMA channel corresponds to 60 information bits per 20 msec frame per CDMA channel. The information bits are denoted $a_1 \ldots a_{60}$, where $a_1$ is the first information bit by the encoder, and $a_{60}$ is the last. The ion bits are encoded with a rate-15/28 ional code, producing 112 transmitted code symbols me, the same as for vocoded data. These code are denoted $c_1 \ldots c_{112}$, where $c_1$ is the first code symbol in the frame, and $c_{112}$ is the last.

The rate-15/28 code may be produced by puncturing the output of the encoder 580 of FIG. 24 to obtain the 15/28 rate. The generators 590 and 592 for the rate-1/2 encoder 580 are still defined by $g_0=753$ (octal) and $g_1$-561 (octal).

As illustrated in FIG. 24, the rate-1/2 code produces 2 code symbols, $b_i(0)$ and $b_i(1)$, from the information bits $\{a_i, \ldots, a_{1-8}\}$ and the two code generators. Subscripts less than one in $\{a_i, \ldots, a_{i-8}\}$ refer to the last information bits of the preceding active frame, with 60 added to the subscript to indicate the information bit location in the preceding frame. In the event that there is no preceding active frame (i.e., the preceding frame is a transition frame or an associated signaling channel frame) then information bits with subscripts less than one are zero. To perform puncturing, not all of these code symbols $b_i(k)$ are transmitted. The transmitted code symbols, $c_1 \ldots c_{112}$, are related to the $b_i(k)$ as illustrated in Table 23. As shown in Table 23, puncturing is achieved by omitting code symbols $b_8(0)$, $b_{15}(0)$, etc.

TABLE 23

| Transmitted Code Symbol ($c_i$) Index | Transmitted Code Symbol | Transmitted Code Symbol ($c_i$) Index | Transmitted Code Symbol |
|---|---|---|---|
| 1 | $b_1$ (0) | 16 | $b_9$ (0) |
| 2 | $b_1$ (1) | 17 | $b_9$ (1) |
| 3 | $b_2$ (0) | 18 | $b_{10}$ (0) |
| 4 | $b_2$ (1) | 19 | $b_{10}$ (1) |
| 5 | $b_3$ (0) | 20 | $b_{11}$ (0) |
| 6 | $b_3$ (1) | 21 | $b_{11}$ (1) |
| 7 | $b_4$ (0) | 22 | $b_{12}$ (0) |
| 8 | $b_4$ (1) | 23 | $b_{12}$ (1) |
| 9 | $b_5$ (0) | 24 | $b_{13}$ (0) |
| 10 | $b_5$ (1) | 25 | $b_{13}$ (1) |
| 11 | $b_6$ (0) | 26 | $b_{14}$ (0) |
| 12 | $b_6$ (1) | 27 | $b_{14}$ (1) |
| 13 | $b_7$ (0) | 28 | $b_{15}$ (1) |
| 14 | $b_7$ (1) | ... | ... |
| 15 | $b_8$ (1) | 111 | $b_{59}$ (1) |
| | | 112 | $b_{60}$ (1) |

The terminal uses the return loop signaling channel (RLSC) to report the signal quality measured on the received forward traffic channel. The RLSC may transmit data at a rate of 50 bps and provide a 6-bit measurement update once each 120 msec, or twice per 240 msec masterframe. This requires one information bit per 20 msec frame. Loop data is transmitted encoded with four code symbol repetitions per information bit to provide low latency. The first four code symbols (two QPSK-symbols) of the multiuse field after the sync field are used for the return loop signaling channel. The bit repetitions occur simultaneously on the in-phase and quadrature-phase of the carrier, thus requiring two QPSK symbols to transmit each bit.

Throughout operation, satellites and associated beam spots move across the earth's surface. As a current beam spot (which maintains a current communications link between a terminal and earth station) moves across a terminal, the current communications link must be reassigned to a new beam spot covering the terminal. Therefore, throughout a communications transmission, each terminal continuously attempts to acquire other subbands identified in the broadcast control channel (BCC). Each beam includes at least one broadcast control channel. Each broadcast control channel includes information identifying broadcast control channels for adjacent beams transmitted from the same satellite or from nearby satellites. Throughout a communications transmission (e.g., while maintaining a traffic channel), each terminal monitors the spectrum of available subbands and attempts to "acquire" one of the subbands. Acquisition is determined successful when a sync field within the broadcast control channel of one of the subbands is measured to have a minimum signal quality. The terminal reports periodically, within a measurement reporting channel, the results of attempted acquisitions and sync field signal quality measurements. These measurement results may be reported continuously over a 30 second period throughout a search procedure.

In this manner, the measurement reporting channel is utilized by the terminal to inform the earth station of alternative beams to which the terminal may be handed off when the current beam passes beyond the terminal.

The measurement reporting channel provides a 100 bps transmission rate at the BER of $10^{-5}$ to report data. This transmission rate corresponds to two information bits per 20 msec frame. The attempt and measurement data is encoded with a rate 1/2 convolutional code, producing four code symbols per frame. The encoder 580 resembles that of FIG. 25 and has constrain length 9 and is defined by the generator taps $g_0$=753 (octal) and $g_{1=561}$ (octal). FIG. 25 illustrates the generation of code symbols, $b_i(0)$ and $b_i(1)$ from the information bits $\{a_i, \ldots, a_{i-8}\}$ and the two code generators. Subscripts less than one in $\{a_i, \ldots, a_{i-8}\}$ refer to the measurement reporting channel information bits in one of the preceding frames, with two added to the subscript to indicate the information bit location in the preceding frame. When first entering a traffic channel (due to initial assignment or handover) the encoder 580 is reset to the all-zeroes state (information bits with subscripts less than one are zero). Tail bits are not transmitted on the measurement reporting channel since, unlike traffic or associated signaling, channels, the measurement reporting channel is never inactive and maintains a continuous flow of data (except for handovers). The transmitted code symbols, $c_1 \ldots c_4$, are related to the $b_i(k)$ as illustrated in Table 24. The encoding process produces four code symbols, $c_1 \ldots c_4$, from the two information bits, $a_1 \ldots a_2$, per 20 msec frame.

TABLE 24

| Transmitted Code Symbol ($c_i$) Index | Transmitted Code Symbol |
| --- | --- |
| 1 | $b_1(0)$ |
| 2 | $b_1(1)$ |
| 3 | $b_2(0)$ |
| 4 | $b_2(1)$ |

The associated signaling channel replaces the traffic (e.g., voice or data) portion of the multiuse field with signaling data. The associated signaling channel data rate is 2,800 kbps including the eight tail bits transmitted at the end of the three frame burst. This corresponds to 56 information bits per 20 msec frame. The information bits are denoted $a_1 \ldots a_{56}$, where $a_1$ is the first information bit received by the encoder, and $a_{56}$ is the last. This information is encoded with a rate 1/2 convolutional code, producing 112 transmitted code symbols per frame, the same as for subscriber data. These code symbols are denoted $c_1 \ldots c_{112}$, where $c_1$ is the first code symbol in the frame, and $c_{112}$ is the last.

The rate-1/2 code used is a constraint length 9 convolutional code defined by the generator taps $g_0$=753 (octal) and $g_1$=561 (octal). FIG. 25 illustrates the encoder which generates code symbols, $b_i(0)$ and big(1), from the information bits $\{a_i, \ldots a_{i-8}\}$ and the two code generators. Subscripts less than one in $\{a_i, \ldots, a_{i-8}\}$ refer to the last information bits of the preceding active frame, with 56 added to the subscript to indicate the information bit location in the preceding frame. In the event that there is no preceding active frame (e.g., the preceding frame is a transition frame) then information bits with subscripts less than one are zero. The transmitted code symbols, $c_1 \ldots c_{12}$, are related to the $b_i(k)$ as illustrated in Table 25.

TABLE 25

| Transmitted Code Symbol ($c_i$) Index | Transmitted Code Symbol |
| --- | --- |
| 1 | $b_1(0)$ |
| 2 | $b_1(1)$ |
| ... | ... |
| 111 | $b_{56}(0)$ |
| 112 | $b_{56}(1)$ |

20.0 Interleaving

Figure 26:
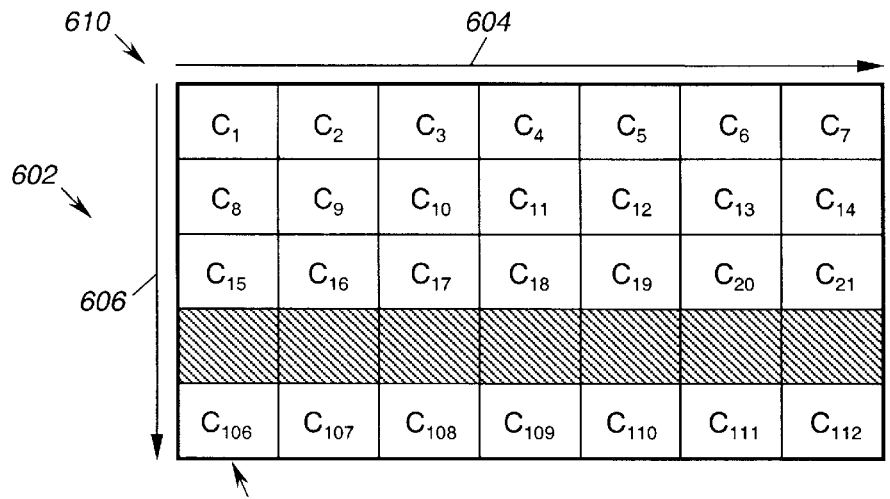
FIG. 26 illustrates a distribution of code symbols in a block interleaver used in the terminal.

With reference to FIGS. 19 and 26, the interleave function is described in more detail. The commandable interleave module 440 receives a stream of code symbols for each frame to be transmitted. By way of example only, a frame of voice traffic may include 112 code symbols within the multiuse field. The interleave module 440 consecutively writes each code symbol into the rows of the interleave block illustrated in FIG. 26. For a 16 by 7 block interleaver, seven code symbols are written into each row 610. Once the block 602 is filled, the interleaver module 440 reads out each column 612 of code symbols. Thus, while code symbols are written into the block interleaver 602 in the direction of arrow 604, row by row, the code symbols are read from the block interleaver in the direction of arrow 606, column by column. The interleave function randomizes errors which may exist within the stream of code symbols. By randomizing code symbol errors, the interleaver corrects for imperfect carrier phase reference signals within a given channel.

Optionally, the interleave module 440 may not be used when transmitting voice data since the interleave function adds latency or delay to voice conversations. However, the interleave function may not noticeably enhance voice transmissions. In contrast, data transmissions experience more pronounced imperfect phase carrier references. Moreover, in many types of data transmissions, latency is not a concern. Hence, it may be more desirable to use the interleave module in connection with data transmissions, not voice transmissions. The interleave module 440 is commandable between on and off, states depending upon the type of transmission (e.g., data or voice).

Optionally, the interleave module 440 may be commandable to select a number of frames within the data transmission which are interleaved. For instance, the module 440 may be selected to interleave more than one frame at a time. For instance, 2, 6 or 12 frames may be selected to be combined in a single interleaving operation. In addition, the width of the interleaver may be varied. For instance, each row 610 may be varied to store 6, 7, 14, 42, 84 and the like code symbols. The number of code symbols stored within each row is based in part on the number of frames to be interleaved in a single operation.

21.0 Voice and Data Activity

The voice and data activity for the return link are controlled by the terminal in a manner similar to that described above for the forward link. The transition frames used to change between active and inactive are discussed below for the return link.

Each traffic channel may be assigned a unique codeword from a set of length-80 orthogonal codewords. The set of codewords used for the return link is the same as for the forward link as described above. Each code symbol in the multiuse portion of the frame is multiplied by one repetition of this codeword, producing a chip rate equal to 272,000 chips/sec during the multiuse field of the frame. The sync field also contains chips clocked at the 272,000 chip/sec rate, but the orthogonal codeword is not employed for this portion of the frame.

To produce a more noise-like waveform, the sequence of orthogonal codewords are multiplied by an isolation code prior to using the chip sequence to spread a user's code symbols. As with the orthogonal spreading sequence, the same code is applied to the in-phase and quadrature-phase code symbols, which is equivalent to BPSK spreading. The isolation code corresponds to the length of the multiuse field, or 4,800 chips. The same 4,800-chip isolation code is used by all CDMA channels in the system. The isolation code begins immediately after the sync field and ends at the end of the frame. Neither the orthogonal codeword nor the isolation code are applied to the sync field.

Figure 31:
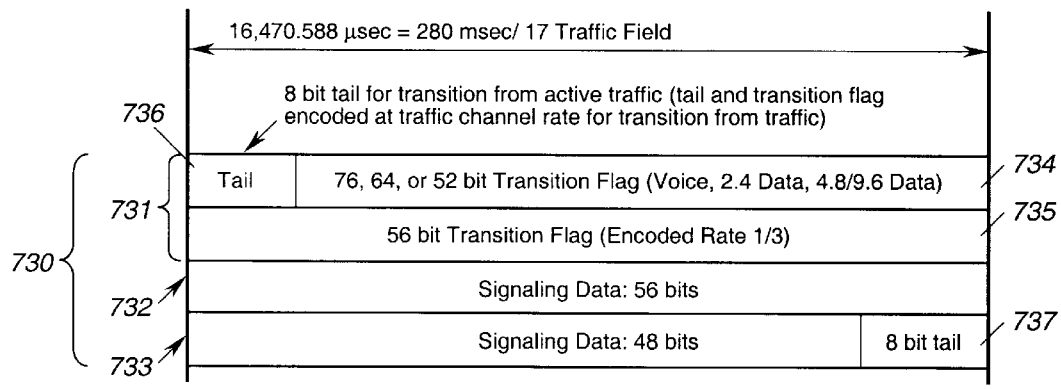
FIG. 31 illustrates the associated signaling channel frame format for a return link.

FIG. 31 illustrates an isolation code generator 750 for generating an isolation code by truncating five repetitions of a 1,023-chip PN sequence. The PN sequence is characterized by the primitive polynomial $X^{10}+X^3+1$ and is generated as shown above. This corresponds to the recursion $y_i+y_{i-3} \oplus y_{i-10}$, where E indicates mod-2 addition module 754. The shift register 752 is initialized with the first 10 chip values: $y_1$ through $y_{10}$ set to {1001001001} respectively. This corresponds to i=11. The recursion is then used to generate $y_{11}$ through $Y_{4800}$.

22.0 Return Spectrum

The return link spectrum transmitted by a terminal using CPCE-QPSK closely matches that of QPSK for the main lobe and first side lobe. Beyond the third side lobe, the spectrum falls off rapidly, thereby reducing unwanted emissions.

23.0 Return Link Frame and Field Structure

Figure 28:
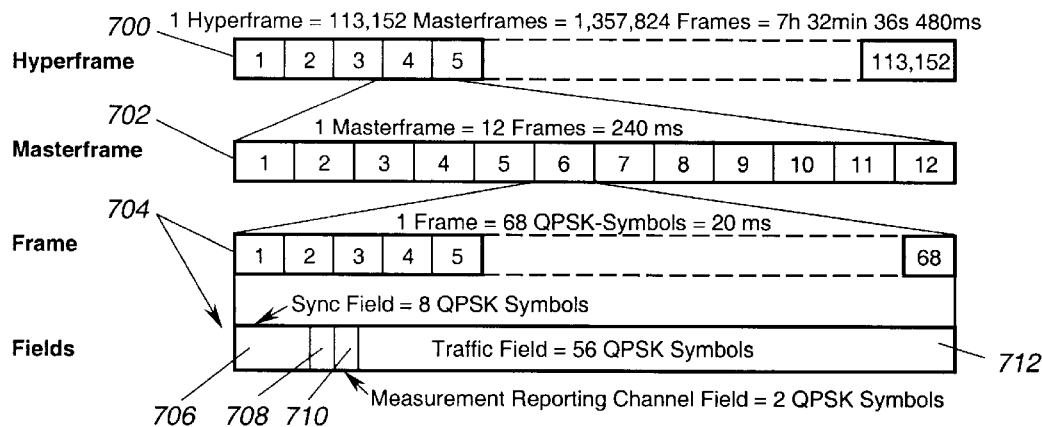
FIG. 28 illustrates a top level return link frame structure.

The top-level frame structure is shown in FIG. 28. The hyperframe 700 is divided into masterframes 702 (1357824 masterframes in the preferred embodiment). The masterframe 702 repeats once each 12 frames 704 and ends on frames whose frame number in the hyperframe is divisible by 12 (e.g., masterframe number 1 consists of frame numbers 1 through 12 in the hyperframe). The terminal transmits a RAC burst at the beginning of a masterframe 702 (as viewed on the forward link) with a random timing offset added by the terminal. The earth station determines a corrected timing for the terminal based on the random burst. The earth station transmits a timing correction on the forward access channel. The terminal combines the timing correction with the random offset to align the return transmission timing of the terminal with the masterframe 702 of the earth station. Because the masterframe is longer than the time ambiguity, this implies knowledge of location within the hyperframe. The masterframe also resolves ambiguity in the return loop signaling information.

Figure 29:
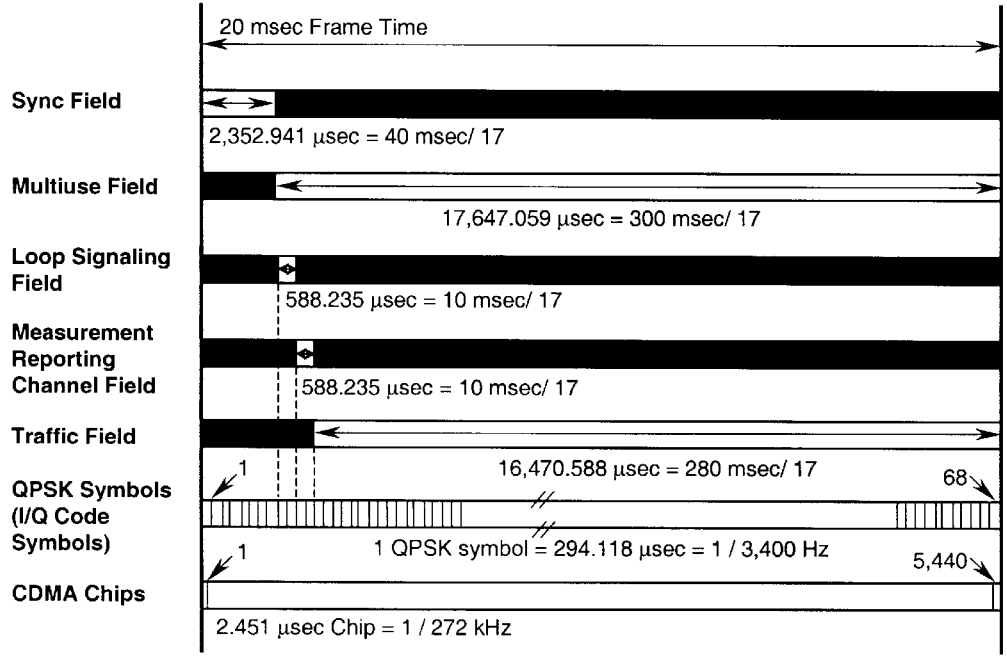
FIG. 29 illustrates the timing relation within the return link of fields, symbols and chips.

The 20 msec frame 704 begins with the eight QPSK symbol sync field 706, which is used to maintain frequency and code tracking for the return link. The sync field 706 enables the terminal to maintain the carrier phase reference during periods of inactivity. The second field 708 contains two QPSK symbols and is devoted to the loop signaling channel. The third field 710 also contains two QPSK symbols and is devoted to the measurement reporting channel. The fourth, and final, field 712 is the 56 QPSK symbol traffic field. Field 712 is devoted to either traffic or the associated signaling channel when the channel is active. During the inactive state, no data is transmitted in the traffic field 712. FIG. 29 shows the timing relationships among the various fields that can comprise a frame.

As illustrated in FIG. 30, the code symbols in stream 500 generated are demultiplexed by demultiplexor 454 (FIG. 19) so that the $c_i$ with i odd are transmitted on the in-phase channel 502 and the $c_i$ with i even are transmitted on the quadrature-phase channel 504.

The return sync field occupies eight symbol time slots at the beginning of each frame. Each symbol time slot is composed of 80 chips which yields a sync field of 640 chips. The chips of the sync field compose the sync code for a particular user and are BPSK modulated onto the carrier without any other data or isolation code (i.e., the 640 sync field chips values described in this section are applied to both the first 640 in-phase chips per frame ({$c_n$}, n=1, ..., 640) and the first 640 quadrature chips per frame).

The sync fields are derived from a length-631 quadratic residue sequence as shown in Table 26. There are 315 such sync fields, numbered from 1 to 316. Table 26 gives exemplary chip values for sync field number 1. Each subband may use up to 80 of the 315 unique sync fields for the 80 possible users. The overlapping nature of the subbands requires that the same sync field not be assigned to adjacent subbands.

In Table 26, $b_n$ equals 1 if n is a quadratic residue of 631, other $b_n$ is equal to 0. Each sync field is obtained by shifting the 631-chip quadratic residue field (chips 8 through 638) by two chips relative to the previous sync field. In addition, the last and first chips of the quadratic residue field are repeated in chip positions 7 and 639, respectively. The two-ship shift, which is equivalent to deleting every other codeword in the orthogonal codeword (e.g., set of codewords), is necessary to maintain orthogonality with other sync fields in the code tracking loop in the presence of up to 1/2-chip errors tracking errors. Chips 4 through 6 are set to 1 so that any 1-chip interval in this field will combine with a 631-chip interval in the quadratic residue field to form a 632-chip orthogonal sequence. Chips 1–3 and 640 maintain the fixed values shown in Table 26.

Each earth station continuously performs an early/late code tracking loop for each terminal communicating therewith. In particular, the earth station correlates the received waveform with 1/2-chip late and 1/2-chip early copies of chip 5 and chips 8 through 638 of that user's sync field code. This correlation is performed using 632 chips over a 634 chip interval, with the second and third chips of the interval not included in the integration. This approach maintains the normal autocorrelation behavior for the desired sync field, while also maintaining orthogonality with all other sync fields for timing errors up to +1/2 chip from correct timing (i.e., up to ±1 chip error from the correct alignment for the 1/2-chip early and 1/2-chip late correlations). The initial four chips in the sync field are not used for the correlation.

TABLE 26

| Sync Field Number | Chip Number | | | | | | | |
|---|---|---|---|---|---|---|---|---|
| | 1 | 2 | 3 | 4 | 5 | 6 | 7 | 8 |
| 1 | 0 | 0 | 1 | 1 | 1 | 1 | $b_{630}$ | $b_0$ |
| 2 | 0 | 0 | 1 | 1 | 1 | 1 | $b_1$ | $b_2$ |
| 3 | 0 | 0 | 1 | 1 | 1 | 1 | $b_3$ | $b_4$ |
| ... | | | | | | | | |
| 314 | 0 | 0 | 1 | 1 | 1 | 1 | $b_{625}$ | $b_{626}$ |
| 315 | 0 | 0 | 1 | 1 | 1 | 1 | $b_{627}$ | $b_{628}$ |

| Sync Field Number | Chip Number | | | | | | | |
|---|---|---|---|---|---|---|---|---|
| | 9 | 10 | 11 | | 637 | 638 | 639 | 640 |
| 1 | $b_1$ | $b_2$ | ... | $b_{628}$ | $b_{629}$ | $b_{630}$ | $b_0$ | 0 |
| 2 | $b_3$ | $b_4$ | ... | $b_{630}$ | $b_0$ | $b_1$ | $b_2$ | 0 |
| 3 | $b_5$ | $b_6$ | ... | $b_1$ | $b_2$ | $b_3$ | $b_4$ | 0 |
| ... | | | | | | | | |
| 314 | $b_{627}$ | $b_{628}$ | ... | $b_{623}$ | $b_{624}$ | $b_{625}$ | $b_{626}$ | 0 |
| 315 | $b_{629}$ | $b_{630}$ | ... | $b_{625}$ | $b_{626}$ | $b_{627}$ | $b_{628}$ | 0 |

TABLE 27

| Chip Numbers | Chip Values | | | | |
|---|---|---|---|---|---|
| 1–40 | 00111100, | 11011001, | 11000001, | 11011010, | 10001011 |
| 41–80 | 11010011, | 11101110, | 11000000, | 11000101, | 01110011 |
| 81–120 | 00001111, | 11111100, | 11110100, | 11011000, | 10100010 |
| 121–160 | 01110000, | 10011011, | 00011101, | 00100111, | 10001010 |
| 161–200 | 11111111, | 01111101, | 11010000, | 11110111, | 00011010 |
| 201–240 | 01111011, | 01001010, | 11000110, | 00100110, | 10011101 |
| 241–280 | 00100000, | 01001011, | 01100101, | 10101001, | 01011001 |
| 281–320 | 00000110, | 10111101, | 11000000, | 11000100, | 01011101 |
| 321–360 | 01010101, | 00010111, | 01110011, | 11110001, | 00001010 |
| 361–400 | 01111101, | 10010101, | 10101001, | 01100100, | 10110111 |
| 401–440 | 11101101, | 00011010, | 01101110, | 01110010, | 10110100 |
| 441–480 | 10000110, | 10011100, | 01000011, | 11010001, | 00000100 |
| 481–520 | 00000010, | 10111000, | 01101101, | 00011100, | 10011011 |
| 521–560 | 11000110, | 11101011, | 10010011, | 01000011, | 00000000 |
| 561–600 | 00111100, | 11000101, | 01110011, | 11110010, | 00100000 |
| 601–640 | 11010000, | 10111010, | 10010001, | 11110001, | 10010000 |

The associated signaling channel shares a physical channel with the sync field, loop signaling field, and measurement reporting channel field. It occupies the traffic field portion of the multiuse field. The return loop signaling channel and measurement reporting channel occupy the initial portion of the multiuse field and remain active throughout all calls regardless of whether the traffic channel is active or inactive. The return loop signaling channel provides a six-bit resolution measurement of the traffic channel signal quality. The terminal updates the six-bit word once each 120 msec, or twice per 240 msec masterframe, and is aligned with the masterframe. The terminal aligns the measurement reporting channel field with the frame count with a frame format that repeats once each 30 seconds.

FIG. 31 illustrates the associated signaling channel frame format 730, which may include a sequence of three 20 msec frames 731–733. The initial frame 731 is a transition frame signaling the start of the two frames of signaling data. The terminal uses alternative data structures for the transition frame 731 depending upon whether the signaling channel follows an active or inactive traffic channel. Reference numeral 734 refers to the data structure for a transition frame which follows an active traffic channel. Reference numeral 735 refers to a data structure for a transition frame following an inactive traffic channel.

The transition frame is followed by first and second signaling information frames 732 and 733. The first and second signaling information frames 732 and 733 include signaling data such as call setup information, handover information, re-registration information and the like. The second signaling information frame 733 concludes with a tail field 737 containing tail bits used to form the concluding code symbols transmitted in the signaling channel. The tail bits may be used to reemerge the Viterbi Decoder Trellis. Upon completion of transmission of the third signaling frame 733, the terminal converts the channel structure to a traffic channel structure in its previous status (e.g., active or inactive) unless the signaling frames represent the completion or termination of a communications link or call.

When the signaling channel follows an inactive traffic channel, the transition frame structure (as denoted at reference numeral 735) may include a 56 bit transition frame encoded based on a predefined convolution code (e.g., a rate-1/3 code). Alternatively, when the signaling channel 730 follows an active traffic channel, the data structure illustrated at reference numeral 734 is utilized for the transition frame 731. The format of transition frame 731 following an active traffic channel may vary depending upon the type of traffic channel being followed (e.g., a voice traffic channel, a 2.4 kbps data channel or a 4.8/9.6 kbps data channel). By way of example only, the transition flag within the transition frame 731 may be encoded based on different convolution codes depending upon the type of traffic channel preceding the signaling channel 730. It is preferable that the transition flag be encoded utilizing the same convolution code rate as used to encode the preceding traffic channel, in order to enable the transition frame 731 to appear to be a valid convolutionally coded sequence.

The transition frame includes 112 code symbols generated rom the information bits sequences in Table 28. The starting state of the convolutional encoder is the ending state of the previous traffic frame, if active, or the all zeroes state if the preceding frame was not an active traffic channel frame. The transmitted code symbols generated from the initial eight zeros are not used in the transition detection algorithm, since they depend on the convolutional code state at the end of the preceding frame.

The earth station modem performs the transition from a traffic channel to an associated signaling based on the degree of match between demodulated code symbols and the code symbols in the transition frame. The degree of match for transition to associated signaling from inactive is the same as described above for transition to active traffic from inactive. The degree of match for transition to associated signaling from active traffic is the same as described above for transition to inactive traffic from active.

TABLE 28

| Transition from Inactive (56 bits, encoded rate 1/2) | | | | |
|---|---|---|---|---|
| 11110101, 01110001, | 00101101, 00011110 | 01011001, | 11001001, | 10010001, |
| Transition from Active Vocoded Voice (84 bits, encoded rate 3/4) | | | | |
| 00000000, 11011010, 0010 | 11101100, 00100111, | 10101110, 01101100, | 10110111, 00111010, | 00110100, 01001000, |
| Transition from Active 2.4 kbps Data (72 bits, encoded rate 9/14) | | | | |
| 00000000, 00000011, | 11000011, 01111010, | 10100100, 00000010, | 10000010, 01010011 | 11000111, |
| Transition from Active 4.8 or 9.6 kbps Data (60 bits, encoded rate 15/28) | | | | |
| 00000000, 01001101, | 10011110, 10100010, | 11001010, 0111 | 11101011, | 01110011, |

A vocoded voice channel shares a physical channel with the sync field, loop signaling field, and measurement reporting channel field. It occupies the traffic field portion of the multiuse field, as shown in FIGS. 28 and 29. The return loop signaling channel and measurement reporting channel occupy the initial portion of the multiuse field and remain active throughout all calls regardless of whether the traffic is active or inactive.

A vocoded voice channel includes a continuing sequence of 20 msec frames which carry 84 information bits of vocoded data. The vocoded data is encoded as described above with the resulting code symbols transmitted. The initial frame in the sequence is a transition frame signaling the start of active vocoded data. The final frame in the sequence is a different type of transition frame indicating the start of inactive channel status. During the inactive status, only the sync field, loop signaling field, the measurement reporting channel field remain active. The sequence of active frames may be interrupted by the associated signaling channel.

The vocoder transition frames consist of the 112 code symbols generated from the information by sequences in Table 29. The starting state of the convolutional encoder is zero for the transition to active. For the transition to inactive, the starting state of the convolution encoder is the ending state of the previous traffic frame.

The earth station performs a transition to an active state if the 112 demodulated code symbols come within 20 code symbols of matching the code symbols in the transition frame. Because the sync field provides a coherent reference, the transition frame is not used to perform the QPSK ambiguity resolution. The earth station modem performs a transition to an inactive state if the 102 least significant demodulated code symbols come within 18 code symbols of matching the corresponding code symbols in the transition frame.

TABLE 29

| Transition to Active Vocoded Voice (56 bits, encoded rate 1/2) | | | | |
|---|---|---|---|---|
| 00101101, 00011110, | 01011001, 01011110 | 11001001, | 10010001, | 01110001, |
| Transition to Inactive Vocoded Voice (84 bits, encoded rate 3/4) | | | | |
| 00000000, 00100111, 0111 | 10101110, 01101100, | 10110111, 00111010, | 00110100, 01001000, | 11011010, 00101100, |

When the terminal transmits data at a 2.4 bps rate, the traffic channel shares a physical channel with the sync field, loop signaling field, and measurement reporting channel field. The data occupies the traffic field portion of the multiuse field, as shown in FIGS. 28 and 29. The return loop signaling channel field and measurement reporting channel field and measurement reporting channel field occupy the initial portion of the multiuse field and remain active throughout all calls regardless of whether the traffic is active or inactive.

When active, a 2.4 kbps data channel transmits a continuous sequence of 20 msec frames which carry 72 information bits of user data and protocol. The information bits are encoded and the resulting code symbols transmitted as described above. The initial data frame in the sequence is a traffic transition frame signaling the start of an active data status. The final frame in the sequence is a different type of traffic transition frame indicating the start of an inactive channel status. During the inactive channel status, only the sync field and loop signaling field remain active. The sequence of active frames may be interrupted by the associated signaling channel, as described above. When the data is interrupted, it is buffered in the terminal and transmitted with a three frame delay until the data source becomes inactive, at which time the buffer is flushed.

The 2.4 kbps data transition frames may include 112 code symbols generated from the information bit sequences in Table 30. The starting state of the convolutional encoder is zero for the transition to active. For the transition to inactive, the starting state of the convolutional encoder is the ending state of the previous traffic frame.

The earth station performs a transition to an active state if the 112 demodulated code symbols come within 20 code symbols of matching the code symbols in the transition frame. Because the sync field provides a coherent reference, the transition frame is not used to perform the QPSK ambiguity resolution. The earth station modem performs a transition to an inactive state if the 100 least significant demodulated code symbols come within 17 code symbols of matching the corresponding code symbols in the transition frame.

TABLE 30

| Transition to Active 2.4 kbps Data (56 bits, encoded rate 1/2) | | | | |
|---|---|---|---|---|
| 00101101, 00011110, | 01011001, 01011110 | 11001001, | 10010001, | 01110001, |
| Transition to Inactive 2.4 kbps Data (72 bits, encoded rate 9/14) | | | | |
| 00000000, 01111010, | 10100100, 00000010, | 10000010, 01010011, | 11000111, 11111100 | 00000011, |

Each of the two or four CDMA channels for transmitting data at 4.8 or 9.6 kbps, respectively, share a physical channel with the sync field, loop signaling field, and measurement reporting channel field. The data channels occupy the traffic field portion of the multiuse field. The return loop signaling channel field and measurement reporting channel field occupy the initial portion of the multiuse field and remain active throughout all calls regardless of whether the traffic is active or inactive.

When active, each CDMA channel transmitting data at 4.8/9.6 kbps transmits a continuous sequence of 20 msec frames which carry 60 information bits of user data and protocol. The information bits are encoded and the resulting code symbols transmitted. The initial frame in the sequence is a transition frame signaling the start of active data. The final frame in the sequence is a different type of transition frame indicating the start of inactive channel status. During the inactive status, only the sync field and loop signaling field remain active. The sequence of active frames may be interrupted by the associated signaling channel. When the data channel is interrupted, the terminal buffers the data and transmits it later with a three frame delay until the data source becomes inactive, at which time the buffer is flushed.

The 4.8/9.6 kbps data terminal transition frames may include 112 code symbols generated from the information bit sequences in Table 31. The starting state of the convolutional encoder is zero for the transition to active. For the transition to inactive, the starting state of the convolutional encoder is the ending state of the previous traffic frame.

The earth station performs a transition to an active state if the 112 demodulated code symbols come within 23 code symbols of matching the code symbols in the transition frame. Because the sync field provides a coherent reference, the transition frame is not used to perform the QPSK ambiguity resolution. The earth station modem shall perform the transition to inactive if the 97 least significant demodulated code symbols come within 19 code symbols of matching the corresponding code symbols in the transition frame.

TABLE 31

| Transition to Active 4.8/9.6 kbps Data (56 bits, encoded rate 1/2) | | | | |
|---|---|---|---|---|
| 00101101, 00011110, | 01011001, 01011110 | 11001001, | 10010001, | 01110001, |

TABLE 31-continued

Transition to Inactive 4.8/9.6 kbps Data
(60 bits, encoded rate 15/28)

| | | | | |
|---|---|---|---|---|
| 00000000, | 11001010, | 11101011, | 01110011, | 01001101, |
| 10100010, | 01110110, | 1100 | | |

The chip and symbol timing are aligned on the return terminal link at the satellite. Because of time delay differences as a function of path through the satellite, chip transitions on the feeder link in general may not be aligned for different feeder channels. Chip alignment on the return terminal link is maintained by using the forward link loop signaling channel to adjust terminal chip timing. The timing of all subbands within a feeder channel assigned to the beam is such that the sync fields and ODS-CDMA chips are aligned, which again is accomplished through the loop signaling channel. The frame alignments for different feeder channels are setable in one QPSK symbol increments to produce staggered locations for the sync field. The terminal link chip and symbol alignment are maintained regardless of the stagger.

24.0 Return Access Channel (RAC) Waveform

As explained above, in order for a terminal and earth station to establish a communications link therebetween, the terminal must be synchronized in timing and frequency with the earth station. The terminal utilizes a return access channel (RAC) to initiate synchronization. When a terminal wishes to initiate a call or when a terminal detects a page being broadcast over the system, the terminal transmits a non-synchronous spread spectrum PN signal access burst over the return access channel. The center frequency of the return access channel is identified in the broadcast control channel for the current beam within which the terminal resides. The subband corresponding to the RAC center frequency, in which the access burst is transmitted is located above or below the subbands utilized by the current beam to simplify routing the RAC through a "bent pipe" satellite.

By way of example, a present beam may utilize subbands 1–4 to carry traffic channels. The return access channel may be assigned a center frequency above or below the four subbands carrying traffic channels. The features of the return access channel first are summarized in Table 32. The RAC burst includes an acquisition field, followed by a sync field, followed by a data field.

Figure 32:
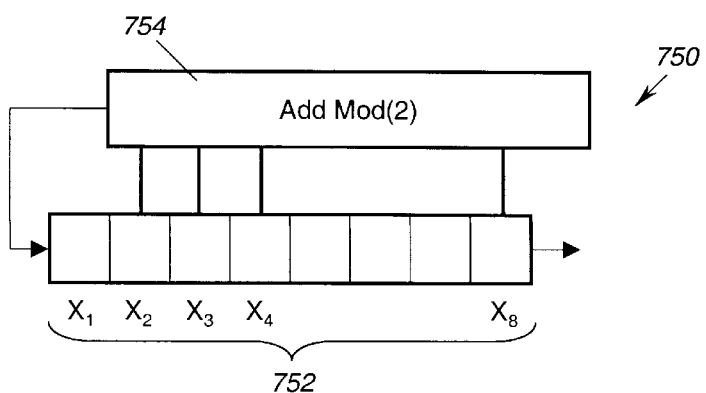
FIG. 32 illustrates a block diagram of a PN sequence generator.

The RAC may be a 360 ms signaling burst transmitted at full handset power. The acquisition field may be 180 ms bi-phase modulated with a 255 chip maximal length PN sequence with a chipping rate of 272 kbps (the same as a traffic channel). The PN sequence may be characterized by the primitive polynomial $X^8+X^4+X^2+1$ and may be generated as shown in FIG. 32. The acquisition field is processed by the earth station for initial signal detection, as well as frequency and time offset estimation.

The frame and symbol sync field is distinguished from the acquisition field in that a length 8 Neuman-Hoffman synchronization word is mod(2) added to the PN spreading sequence before bi-phase modulation of the carrier. The clocking rate of the sync word is 34 kbps so that one symbol of the sync word is eight PN sequences long. The spreading sequence and sync word transitions are synchronized to occur at the same time. The Sync Field is 30 ms long, which corresponds to 32 repetitions of the PN code and four repetitions of the sync word. The sync sequence may be 00011101.

The Data Field modulation may be bi-phase modulated using 8-ary orthogonal waveforms which are spread with the same spreading sequence used for the acquisition field and sync field. A data symbol is eight PN periods long, which gives a symbol rate of 133.33 symbols/sec. Each chip of the orthogonal code word is one PN sequence long. The orthogonal code word is shown in Table 33.

TABLE 32

| Item | Parameter Value |
|---|---|
| Acquisition Field | |
| Field length | 180 ms |
| PN m-sequence length | 255 chips |
| PN primitive polynomial | $X^8 + X^4 + X^2 + 1$ |
| Chipping rate, Rc | 272 kcps |
| Number of PN periods in field | 192 |
| Modulation | bi-phase |
| Frame and Symbol Sync Field | |
| Field length | 30 ms |
| PN m-sequence length and polynomial | as above |
| Chipping rate, Rc | as above |
| Sync word | 00011101 |
| Sync word chip rate | 34 kcps |
| Number of repeats | 4 |
| Data Field | |
| Field length | 150 ms |
| PN m-sequence length and polynomial | as above |
| Chipping rate, Rc | as above |
| Data modulation | 8-ary orthogonal sequence |
| Symbol rate | 133.33 symbols/sec |
| Symbol period | 7.5 ms |
| Symbols in data field | 20 |
| Number of bits in data field | 60 |

TABLE 33

| Information Bits | Modulation Phase | | | | | | | |
|---|---|---|---|---|---|---|---|---|
| 000 | 1 | 1 | 1 | 1 | 1 | 1 | 1 | 1 |
| 001 | 1 | −1 | 1 | 1 | −1 | 1 | −1 | −1 |
| 010 | 1 | 1 | 1 | −1 | 1 | −1 | −1 | −1 |
| 011 | 1 | 1 | −1 | 1 | −1 | −1 | −1 | 1 |
| 100 | 1 | −1 | 1 | −1 | −1 | −1 | 1 | 1 |
| 101 | 1 | 1 | −1 | −1 | −1 | 1 | 1 | −1 |
| 110 | 1 | −1 | −1 | −1 | 1 | 1 | −1 | 1 |
| 111 | 1 | −1 | −1 | 1 | 1 | −1 | 1 | −1 |

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of providing a satellite based telecommunications link between earth stations and terminals via satellites, said method comprising:
   maintaining forward and return communications channels over forward and return communications links, respectively, between earth stations and terminals, via satellites;
   utilizing orthogonal CDMA codes to maintain forward communications links for multiple terminals synchronous with one another;
   utilizing orthogonal CDMA codes to maintain return communications links from multiple terminals synchronous with one another at a common earth station;

measuring and calculating, at the earth station, chip timing error correction information for said return communications links based on a sync field in said communications links;

transmitting, to a terminal, said chip timing error correction information over a loop signaling channel; and updating, at the terminal, chip timing error using said chip timing error correction information received.

2. A method of providing a satellite based telecommunications link between earth stations and terminals via satellites, said method comprising:

maintaining forward and return communications channels over forward and return communications links, respectively, between earth stations and terminals, via satellites;

utilizing orthogonal CDMA codes to maintain forward communications links for multiple terminals synchronous with one another;

utilizing orthogonal CDMA codes to maintain return communications links from multiple terminals synchronous with one another at a common earth station;

measuring and calculating, at the earth station, power update information for said return communications links based on a code symbol error rate in said communications links;

transmitting, to a terminal, said calculated power update information over a loop signaling channel; and updating, at a terminal, a power level using said power update information received.

3. A method of providing a satellite based telecommunications link between earth stations and terminals via satellites, said method comprising:

maintaining forward and return communications channels over forward and return communications links, respectively, between earth stations and terminals, via satellites;

utilizing orthogonal CDMA codes to maintain forward communications links for multiple terminals synchronous with one another;

utilizing orthogonal CDMA codes to maintain return communications links from multiple terminals synchronous with one another at a common earth station;

measuring and calculating, at the earth station, frequency offset error correction information for said return communications links based on a carrier tracking loop;

transmitting, to a terminal, said frequency offset error correction information over a loop signaling channel; and updating, at the terminal, a frequency offset using said frequency offset error correction information received.

* * * * *